United States Patent
Fujisaki

[11] Patent Number: 5,980,121
[45] Date of Patent: Nov. 9, 1999

[54] SLIDING MOVEMENT LOCKING APPARATUS AND SLIDING COVER APPARATUS FOR A CAMERA

[75] Inventor: Yoshifumi Fujisaki, Saitama-ken, Japan

[73] Assignee: Asahi Kogaku Kogyo Kabushiki Kaisha, Tokyo, Japan

[21] Appl. No.: 09/014,242

[22] Filed: Jan. 27, 1998

[30] Foreign Application Priority Data

Jan. 28, 1997 [JP] Japan ...................................... 9-013863
Feb. 10, 1997 [JP] Japan ...................................... 9-026898
Feb. 17, 1997 [JP] Japan ...................................... 9-032350

[51] Int. Cl.$^6$ .................................................. G03B 19/12
[52] U.S. Cl. .......................................... 396/349; 396/448
[58] Field of Search ..................................... 396/348, 349, 396/448, 535

[56] References Cited

U.S. PATENT DOCUMENTS

D. 387,368 12/1997 Matsuda .
4,522,478 6/1985 Kando et al. .
5,708,884 1/1998 Morishita .

FOREIGN PATENT DOCUMENTS 1255839 10/1989 Japan .
9197480 7/1997 Japan .

*Primary Examiner*—Howard B. Blankenship
*Attorney, Agent, or Firm*—Greenblum & Bernstein, P.L.C.

[57] ABSTRACT

A sliding movement locking apparatus for a sliding over of a camera includes a lens barrel, a sliding cover, a drive member which is moved in association with the movement of the lens barrel and which is provided with a rack, a first gear which engages with the rack of the drive member, a second gear coaxial and relatively rotatable to the first gear, a sliding movement locking member which is provided with a rack which engages with the second gear and which is moved to prevent the movement of the sliding cover into a closed position thereof when the locking member is at the forward extremity of movement, and a clutch mechanism is provided between the first and second gears, for rotating the first and second gears together without play therebetween when the lens barrel is moved from the retracted position to the photographing position, and for initially rotating the first gear by a predetermined angle and thereafter rotating the first and second gears together when the lens barrel is moved from the photographing position to the retracted position. The invention is also directed to a sliding cover apparatus for a camera.

11 Claims, 17 Drawing Sheets

SLIDING MOVEMENT LOCKING APPARATUS AND SLIDING COVER APPARATUS FOR A CAMERA

BACKGROUND OF THE INVENTION

1. Field of the Invention

The present invention relates to a locking apparatus for a sliding cover of a camera. The present invention also relates to a sliding cover apparatus of a camera.

2. Description of the Related Art

In a camera in which the front portion of a photographing lens can open and close via a sliding cover, when the sliding cover is opened, a main switch is turned ON and the photographing lens is advanced from a retracted position to an operational position. In such a camera, a safety device is provided to prevent the closure of the sliding cover when the photographing lens is advanced to the operational position in association with the movement of the photographing lens barrel to thereby prevent an interference of the sliding cover with the photographing lens. In the sliding movement locking apparatus, it is preferable that the safety device operates in association with the movement of the lens barrel to prevent the closure of the sliding cover when the photographing lens is in the operational position. When the photographing lens is moved from the operational position to the retracted position, and if the locking-restraint on the sliding cover is discontinued at the same time as the commencement of the retraction operation of the photographing lens barrel into the camera body, the sliding cover may try to close before the photographing lens is completely retracted, thus resulting in the sliding cover interfering with the photographing lens.

Moreover, in the sliding movement locking apparatus of the type mentioned above, if the sliding cover is forcedly or suddenly moved from the open position to the closed position, the sliding cover engages with the sliding movement locking member, so that it is impossible to cancel the locking-restraint on the sliding cover via the safety device in spite of the retraction of the lens barrel. Consequently, the sliding movement locking safety device or the lens barrel driving system can possibly be damaged due to the excessive force exerted thereon.

It is necessary to stop the sliding cover at the open position or the closed position and to apply a certain amount of friction to the sliding cover during the sliding movement. To this end, the camera body or the sliding cover is provided with a 'click spring' and the sliding cover or the camera body is provided with a 'click hole' in which the click spring is engaged. The click spring must be always brought into spring-contact with the camera body and the sliding cover, i.e., must be located in a position in which the click spring is not visible even in the open position and the closed position of the sliding cover. To this end, in a known camera, the camera body is provided with an overlap portion which always overlaps the sliding cover in the direction of the sliding movement of the sliding cover, so that the click spring is disposed underneath the overlap portion. However, the overlap portion invites an increase in the sliding movement of the sliding cover, contrary to the miniaturization of the camera.

The assignee of the present application has proposed a dual sliding cover system in which an auxiliary sliding cover is disposed on the rear side of the main sliding cover in the open position, wherein when the main sliding cover is moved toward the closed position, the auxiliary sliding cover is moved further in the same direction relative to the main sliding cover (U.S. Ser. No. 08/784,920). In this dual sliding cover system, the displacement of the main sliding cover can be reduced due to the dual sliding cover plate, and hence the size of the camera in the direction of the movement of the main sliding cover can be reduced. In particular, the increase in the size of the auxiliary sliding cover makes it possible to reduce the displacement of the main sliding cover. However, if the auxiliary sliding cover is larger than a predetermined size, the amount of overlap between the main sliding cover and the auxiliary sliding cover is increased when the main and auxiliary sliding covers are retracted. Consequently, there is a possibility that the overlap portion cannot be provided in the front portion of the camera.

SUMMARY OF THE INVENTION

It is an object of the present invention to provide an apparatus for locking the sliding movement of the sliding cover in a camera in which the power source is turned ON or OFF by the sliding movement of the sliding cover allowing the movement of the photographing lens between the retracted position and the photographing position, wherein the locking-restraint can be discontinued without interference between the photographing lens and the sliding cover.

Another object of the present invention is to provide a simple sliding movement locking apparatus in which no damage of the sliding cover due to a forced operation occurs.

Still another object of the present invention is to provide a simple sliding cover apparatus in which no overlap portion is needed in the front portion of the camera and which facilitates the miniaturization of the camera.

According to an aspect of the present invention, there is provided a sliding movement locking apparatus for a sliding cover of a camera including a lens barrel which is movable between a photographing position and a retracted position, a sliding cover which can be moved in front of the lens barrel which is in the retracted position, and a drive member which is moved in the forward and rearward direction of the camera in association with the movement of the lens barrel between the photographing position and the retracted position and which is provided with a rack. Also included is a first gear which engages with the rack of the drive member and a second gear coaxial to the first gear, which is rotatable relative to the first gear. A sliding movement locking member is provided with a rack which engages with the second gear and which is moved in the forward and rearward direction of the camera in accordance with the rotation of the second gear to prevent the movement of the sliding cover into a closed position thereof when the locking member is at the forward extremity position of movement. A clutch mechanism is provided between the first and second gears for rotating the first and second gears together without play therebetween when the lens barrel is moved from the retracted position to the photographing position, and for initially rotating the first gear by a predetermined angle and thereafter rotating the first and second gears together when the lens barrel is moved from the photographing position to the retracted position.

According to another aspect of the present invention, there is provided a sliding movement locking apparatus which has a projection, projecting in the axial direction of the first gear, a rotatable clutch member coaxial to the first gear which is provided with an upright wall portion which can be engaged or disengaged by the projection, a coil spring which is in spring-contact with the clutch member and the second gear at a predetermined angular phase, and a linearly extending biasing spring which biases the locking member toward the forward extremity position. The first gear and said clutch member are located at an angular phase position in which the projection is disengaged from the upright wall portion when the lens barrel is in the photographing position. The first gear is rotated relative to the clutch member until the projection engages with the upright wall portion when the lens barrel is moved from the photographing position to the retracted position, and thereafter the clutch member is rotated relative to the second gear until a predetermined amount of deflection of the coil spring is produced. The first gear is rotated in a direction to move the projection away from the upright wall portion and the second gear which engages with the rack of the locking member is rotated in the same direction in association with the rotation of the first gear by the spring force of the linearly extending biasing spring when the lens barrel is moved from the retracted position to the photographing position.

To this end, it is preferable that the spring force of the linearly extending biasing spring which biases the second gear in the direction to move the locking member toward the forward extremity position be stronger than the spring force of the coil spring which connects the clutch member and the second gear under a spring force.

Preferably, when the movement of the lens barrel from the retracted position to the photographing position takes place, the drive member and the locking member are moved together to the forward extremity position, and when the movement of the lens barrel from the photographing position to the retracted position takes place, the drive member is moved together with the lens barrel to the rearward extremity position and the locking member begins moving rearward when the drive member has moved by a predetermined displacement.

According to still another aspect of the present invention there is provided a sliding movement locking apparatus for a sliding cover of a camera including a lens barrel which is movable between a photographing position and a retracted position, a sliding cover which can be moved in front of the lens barrel which is in the retracted position, and a drive member which is moved in the forward and rearward direction of the camera in association with the movement of the lens barrel between the photographing position and the retracted position and which is provided with a rack. Also included is a first gear which engages with the rack of the drive member, a second gear coaxial to the first gear which is rotatable relative to the first gear. A sliding movement locking member is provided with a rack which engages with the second gear and which is moved in the forward and rearward direction of the camera in accordance with the rotation of the second gear to prevent the movement of the sliding cover into a closed position thereof when the locking member is at the forward extremity position. A clutch mechanism provided between the first and second gears, the clutch mechanism rotates the first and second gears together after a predetermined angle of rotation of the first gear in a normal state in which the locking member is movable in the rearward direction in association with the movement of the lens barrel from the photographing position to the retracted position, and the clutch mechanism rotates the first gear without rotating the second gear even after the first gear rotates beyond a predetermined angle of rotation so that the first gear only rotates to thereby permit the lens barrel to move in an abnormal state in which the locking member cannot move in the rearward direction in association with the movement of the lens barrel from the photographing position to the retracted position.

For instance, if the sliding cover is suddenly or forcibly moved to the closed position, there is a possibility that the sliding cover is locked at the forward extremity position. However, in the arrangement mentioned above, even if the sliding cover interferes with the locking member, so that the sliding cover cannot be moved, the lens barrel can be returned to the retracted position with the help of the clutch mechanism. Thus, it is possible to prevent the elements of the sliding movement locking apparatus or the drive mechanism of the lens barrel, etc., from being broken or destroyed.

In an embodiment, a sliding movement locking apparatus further comprises a projection which projects in the axial direction of the first gear, a rotatable clutch member coaxial to the first gear, which is provided with an upright wall portion which can be engaged or disengaged by the projection, a coil spring which elastically connects the clutch member and the second gear at a predetermined angular phase, and a linearly extending biasing spring which biases the locking member toward the forward extremity of movement, wherein said first gear and said clutch member are located at an angular phase position in which the projection is disengaged from the upright wall portion when the lens barrel is in the photographing position, said first gear is rotated relative to the clutch member until the projection engages with the upright wall portion when the lens barrel is moved from the photographing position to the retracted position, and thereafter said second gear, which is connected to the clutch member under a spring force, is rotated. The first gear is rotated in a direction to move the projection away from the upright wall portion. The second gear, which engages with the rack of the locking member, is rotated in the same direction in association with the rotation of the first gear by the spring force of the linearly extending biasing spring when the lens barrel is moved from the retracted position to the photographing position.

Preferably, upon occurrence of the abnormal operation to lock the locking member in the forward extremity position, the first gear is rotated relative to the clutch member until the projection engages with the upright wall portion and thereafter the coil spring is deformed so that the clutch member is rotated relative to the second gear, when the lens barrel is moved from the photographing position to the retracted position.

In an embodiment, when the lens barrel is returned to the retracted position and if the abnormal operation to lock the locking member in the forward extremity position is released, the locking member is moved rearward from the forward extremity position due to the restoring force of the coil spring.

To this end, the spring force of the coil spring connecting the clutch member and the second gear is preferably stronger than the spring force of the linearly extending biasing spring to bias the second gear toward the forward extremity position of the locking member.

To respond to an abnormal operation, a sliding movement locking apparatus for the sliding cover of the camera can include a lens barrel which is movable between a photographing position and a retracted position, a sliding cover which can be moved in front of the lens barrel which is in the retracted position, a sliding movement locking member which is moved in the forward and rearward direction of the camera and prevents the movement of the sliding cover into a closed position thereof at the forward extremity of movement of the locking member. Also included is an association drive member which moves the locking member to the forward extremity position when the lens barrel is in the photographing position and which moves the locking member from the forward extremity position when the lens barrel is in the retracted position. A clutch mechanism is provided in the association drive mechanism, which associates the locking member with the lens barrel in the normal state in which the locking member is movable in association with the lens barrel and breaks the association of the locking member with the lens barrel to thereby permit the lens barrel to move in an abnormal state in which an external force is applied to the locking member to make the movement thereof impossible.

The clutch mechanism can be comprised of a spring means which is deformed due to the force produced by the movement of the lens barrel when an abnormal operation in which an external force is applied to prevent the movement of the locking member is carried out and which associates the locking member with the lens barrel due to the restoring force of the spring means when the abnormal operation has been discontinued.

According to another aspect of the present invention, there is provided a sliding cover apparatus for a camera comprising a guide rail provided on the front surface of the camera, a sliding cover which is provided with a pair of sliding contact surfaces which are located on opposite sides of the guide rail and which is movable through the guide rail between an open position in which a photographing lens is exposed and a closed position in which the photographing lens is enclosed by the sliding cover. A pair of 'click holes' are provided on at least one of the sliding contact surfaces of the sliding cover and correspond to the open and closed positions of the sliding cover. A leaf spring receiving portion is provided in the guide rail and opening into at least one of the sliding contact surfaces of the sliding cover. A leaf spring in the leaf spring receiving portion which is deformable so as to come into spring-contact with at least one of the sliding contact surfaces. The leaf spring is provided with stop portions which can be engaged or disengaged via the click holes due to the elastic deformability.

Preferably, the leaf spring give a frictional resistance to the sliding contact surfaces when the sliding cover is moved between the open position and the closed position.

The leaf spring receiving portion can be a hole which extends through the guide rail and receives the sliding contact surfaces of the sliding cover. The leaf spring preferably has a generally U-shape having opposed portions which can be elastically deformed in the direction perpendicular to the direction of the movement of the sliding cover so as to come into sliding contact with the sliding contact surfaces.

Preferably, a pair of portions to be guided and a pair of guide rails are arranged substantially in parallel on opposite sides of the photographing lens.

In an embodiment, the sliding cover includes a main sliding cover provided on the outer front surface of the camera. Provision is made for an auxiliary sliding cover which is provided on the rear surface of the main sliding cover so as not to overlap the guide rail and which is supported so as to move relative to the main sliding cover in the direction of the movement of the main sliding cover. An association drive mechanism is provided between the main sliding cover and the auxiliary sliding cover, which moves the auxiliary sliding cover in the same direction as the main sliding cover due to the force produced by the movement of the main sliding cover toward the open position to thereby increase the amount of overlap between the main sliding cover and the auxiliary sliding cover and which moves the auxiliary sliding cover in the same direction as the main sliding cover due to the force produced by the movement of the main sliding cover toward the closed position to thereby decrease the amount of overlap between the main sliding cover and the auxiliary sliding cover.

With this double-plate type sliding cover apparatus, the displacement of the main sliding cover can be reduced, thus leading to the miniaturization of the camera.

In such a double plate type sliding cover apparatus, it is difficult to provide an overlap portion in the front portion of the camera body if the auxiliary sliding cover is relatively large. To solve this difficulty, the present invention proposes a sliding cover apparatus for a camera having a guide rail provided on the front surface of the camera, a main sliding cover which is movable through the guide rail between an open position in which a photographing lens is exposed and a closed position in which the photographing lens is enclosed by the main sliding cover, an auxiliary sliding cover which is provided on the rear surface of the main sliding cover so as not to overlap the guide rails and which is supported so as to move relative to the main sliding cover in the direction of the movement of the main sliding cover. An association drive mechanism is provided between the main sliding cover and the auxiliary sliding cover which moves the auxiliary sliding cover in the same direction as the main sliding cover due to the force produced by the movement of the main sliding cover toward the open position to thereby increase the amount of overlap between the main sliding cover and the auxiliary sliding cover and which moves the auxiliary sliding cover in the same direction as the main sliding cover due to the force produced by the movement of the main sliding cover toward the closed position. Hence, a decrease in the amount of overlap between the main sliding cover and the auxiliary sliding cover can be achieved. A leaf spring receiving portion is provided in the guide rail and a leaf spring received in the leaf spring receiving portion and having a stop portion is provided which can be engaged or disengaged by a click hole formed in the main sliding cover.

Preferably, the guide rails on the camera body side are made of a pair of guide rails arranged substantially in parallel on opposite sides of the photographing lens. The main sliding cover can be provided with a pair of extensions which extend from the end surface thereof adjacent to the photographing lens along the guide rails and which are located on opposite sides of the photographing lens when the main sliding cover is open. The auxiliary sliding cover moves into and out of an area defined by the main sliding cover and between the extensions in association with the movement of the main sliding cover. Consequently, the displacement of the main sliding cover corresponding to the length of the extensions can be reduced.

If the extensions of the main sliding cover are provided on the rear surfaces thereof with click holes which define the open position of the main sliding cover, the main sliding cover can be moved while effectively utilizing the length of the extensions.

The present disclosure relates to subject matter contained in Japanese Patent Applications Nos. 9-13863 (filed on Jan. 28, 1997), 9-26898 (filed on Feb. 10, 1997) and 9-32350 (filed on Feb. 17, 1997) which are expressly incorporated herein by reference in their entireties.

BRIEF DESCRIPTION OF THE DRAWINGS

The invention will be described below in detail with reference to the accompanying drawings, in which.

DESCRIPTION OF THE PREFERRED EMBODIMENT

Figure 1:
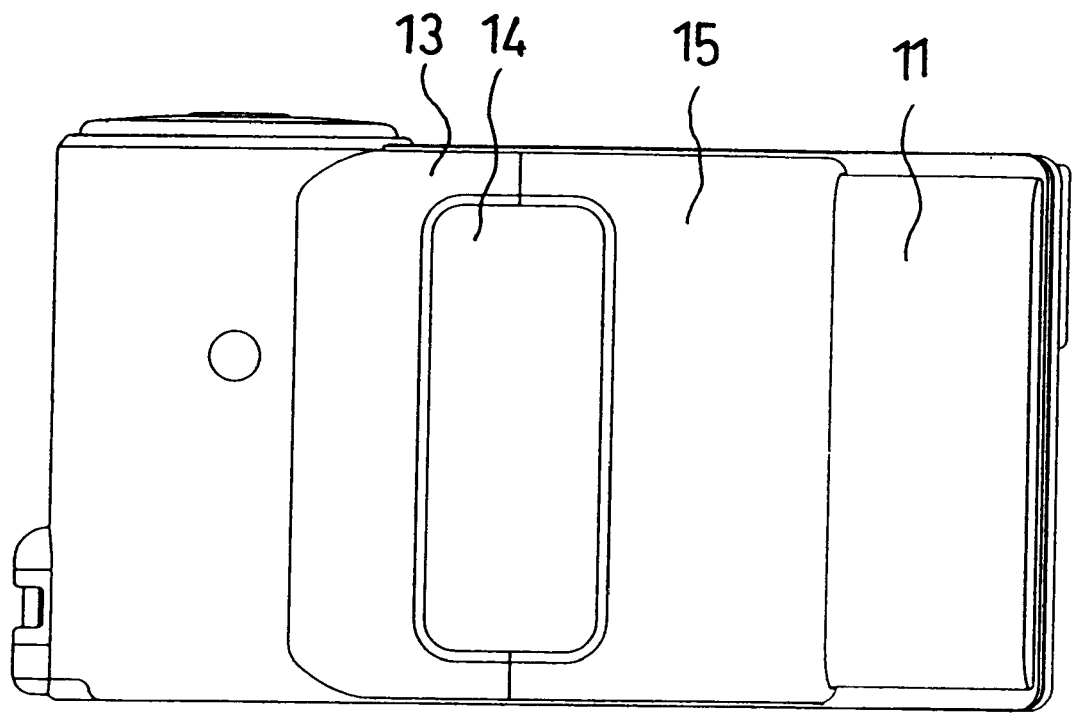
FIG. 1 is a front elevational view of a camera having a sliding movement locking apparatus for a sliding cover shown in a retracted (closed) position in which a photographing lens is retracted in a camera body, according to the present invention.
Figure 2:
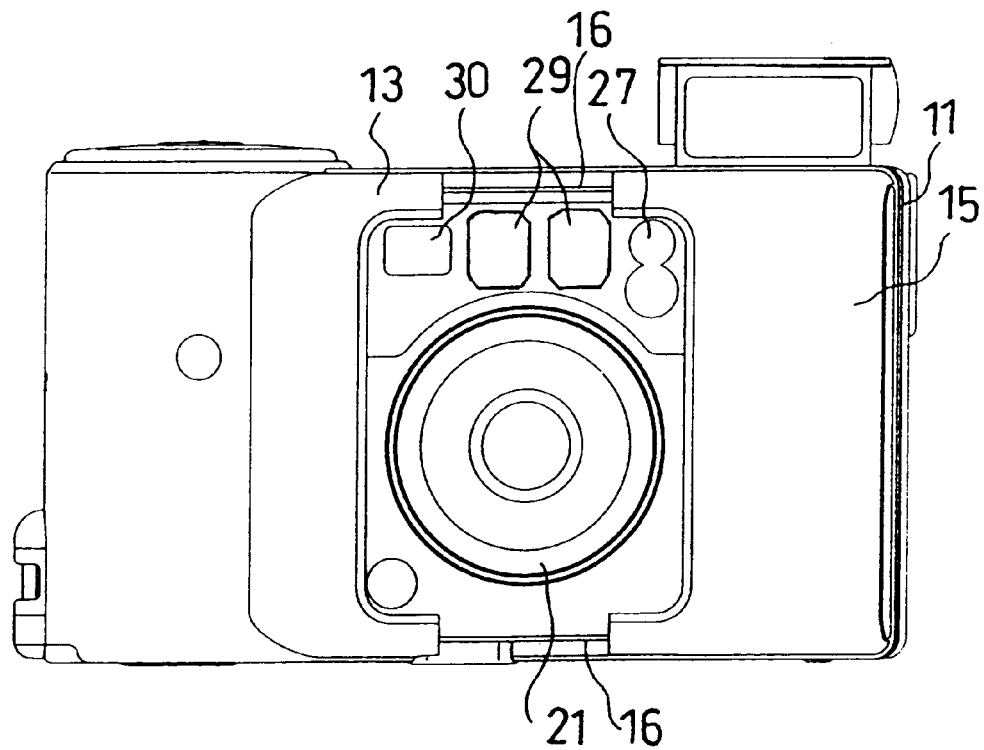
FIG. 2 is a front elevational view of a camera shown in a photographing position, according to the present invention.
Figure 3:
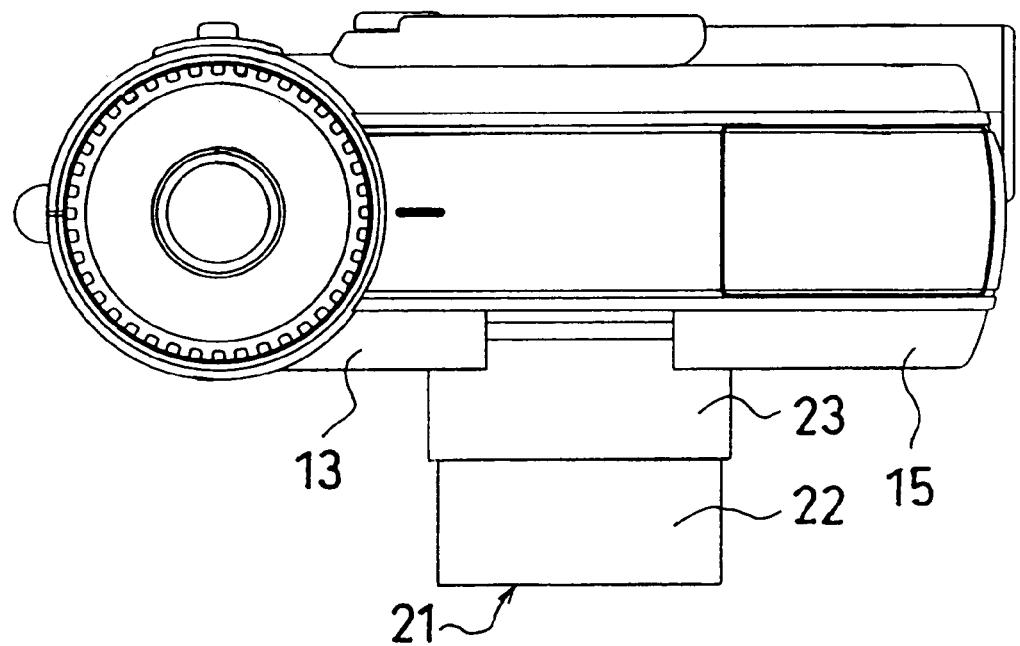
FIG. 3 is a plan view of camera shown in a photographing position, according to the present invention.
Figure 4:
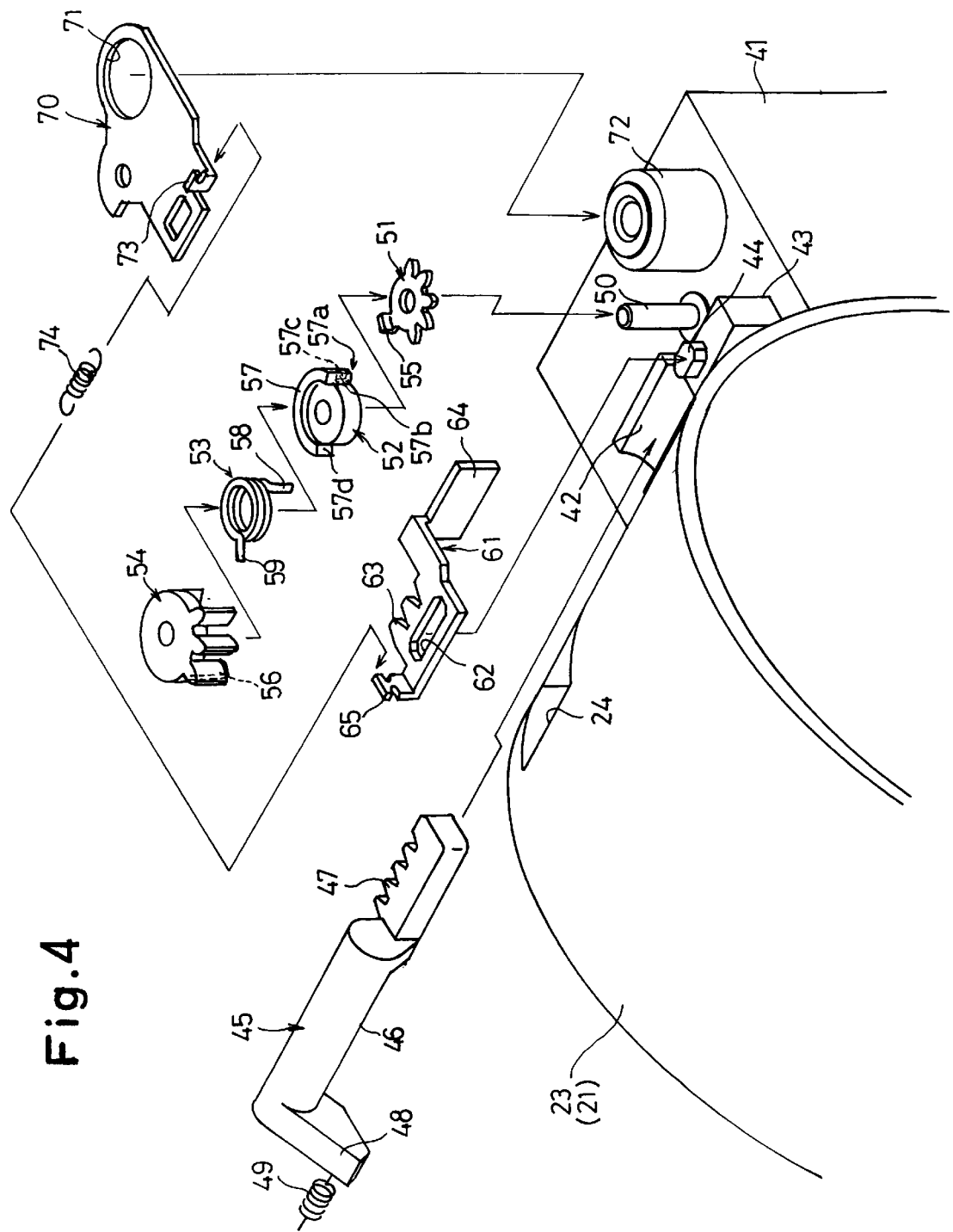
FIG. 4 is an exploded perspective view of a sliding movement locking apparatus according to the present invention.

FIGS. 1 through 3 show an embodiment of a camera to which a sliding movement locking apparatus according to the present invention is applied. The camera is provided with a zoom lens barrel 21 on the center portion of the front surface of the camera body 11. The zoom lens barrel 21 is comprised of first and second lens barrels 22 and 23 which are movable in the zoom range between a rearward position (retracted position) and a forward position (photographing position) in the optical axis direction. The zoom lens barrel 21 is of a collapsible mount type which can retract into the camera body. The zoom lens barrel 21 is moved in the optical axis direction by a zoom motor provided in the camera body 11. The camera body 11 is provided on its front surface with a stationary cover 13, an auxiliary sliding cover 14, and a main sliding cover 15 to protect the zoom lens barrel 21 retracted in the camera body. The stationary cover 13 is secured to the camera body 11 and the main sliding cover 15 is supported to move in the longitudinal direction of the camera body 11 along sliding rails 16. The auxiliary sliding cover 14 is associated with the main sliding cover 15 and closes a vertically elongated rectangular opening defined between the stationary cover 13 and the main sliding cover 15 in a closed position in which the main sliding cover 15 abuts against the stationary cover 13 (FIG. 1). In an open position in which the main sliding cover 15 is moved away from the stationary cover 13, the auxiliary sliding cover 14 is moved together with the main sliding cover 15 in the same direction and is further moved behind the main sliding cover 15, so that the zoom lens barrel 21 can be exposed (FIG. 2). The camera body 11 is provided on the front surface thereof with a photometering window 27, a focusing window (object distance measuring window) 29 and a finder opening 30, which are all exposed when the sliding covers 14 and 15 are opened.

The camera is provided with a main switch (not shown) which is actuated immediately before the sliding cover 15 reaches the full-open position from the closed position or when the sliding cover 15 is slightly moved from the full-open position toward the closed position. Namely, the main switch is turned ON immediately before the sliding cover 15 reaches the full-open position and is turned OFF when the sliding cover 15 is slightly moved from the full-open position toward the closed position. When the main switch is turned ON, the zoom motor is driven in the forward direction to advance the lens barrels 22 and 23 to the photographing position (photographable position). When the main switch is turned OFF, the zoom motor is reversed to retract the lens barrels 22 and 23 rearward to the fully retracted position. The lens barrels 22 and 23 in the photographing position interfere with the sliding plane of the sliding cover 15 (FIG. 3). Since the zoom lens barrel 21 can continuously vary the focal length, the photographable position refers to a zoom range from a wide angle position to which the lens barrels 22 and 23 are first moved forward from the retracted position when the main switch is turned ON to a telephoto position in which the lens barrels 22 and 23 are advanced to the frontmost position.

Figure 5:
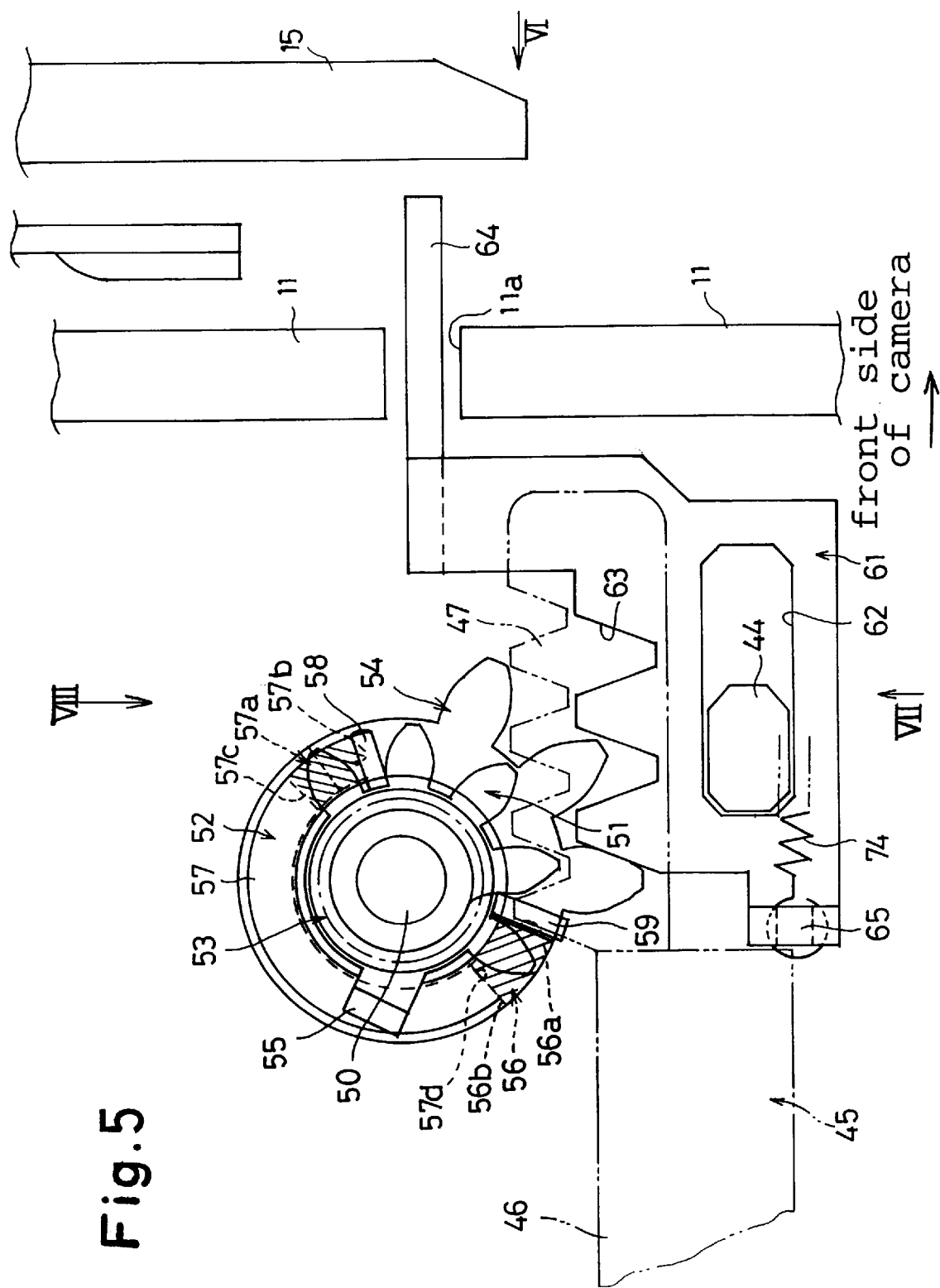
FIG. 5 is a plane view of main elements of a sliding movement locking apparatus shown in a photographing position.

FIGS. 4 through 9 show in detail the sliding movement locking apparatus for the sliding cover, according to the present invention. The second lens barrel 23 is provided, on the cylindrical surface thereof, with a pin engaging hole 24. The camera body 11 includes therein a support 41 located adjacent to the second lens barrel 23 and provided with a drive-pin support member 42. The drive-pin support member 42 is equipped with a sliding groove which receives therein the cylindrical shaft portion 46 of the barrel drive-pin drive member, so that the barrel drive-pin 45 is slidably supported to slide in the direction parallel with the direction of the movement of the second lens barrel 23. The barrel drive-pin 45 is also provided with a rack 47 extending in the forward direction of the camera and a radial projection 48 on the rear side of the camera body. The barrel drive-pin 45 is biased forward by a biasing spring 49 toward the advanced position (FIG. 5). The radial projection 48 is fitted in the pin engaging hole 24 of the second lens barrel 23, so that when the second lens barrel 23 is in the retracted position, the barrel drive-pin 45 is retracted toward the rear position (FIG. 9) provided in the rear portion of the camera against the biasing spring 49. When the second lens barrel 23 is moved to the photographing position (photographable position), the restraint on the pin engaging hole 24 is released, so that the barrel drive-pin 45 is moved forward by the biasing spring 49. Consequently, the barrel drive-pin 45 is moved in association with the movement of the second lens barrel 23 (zoom lens barrel 21).

Figure 6:
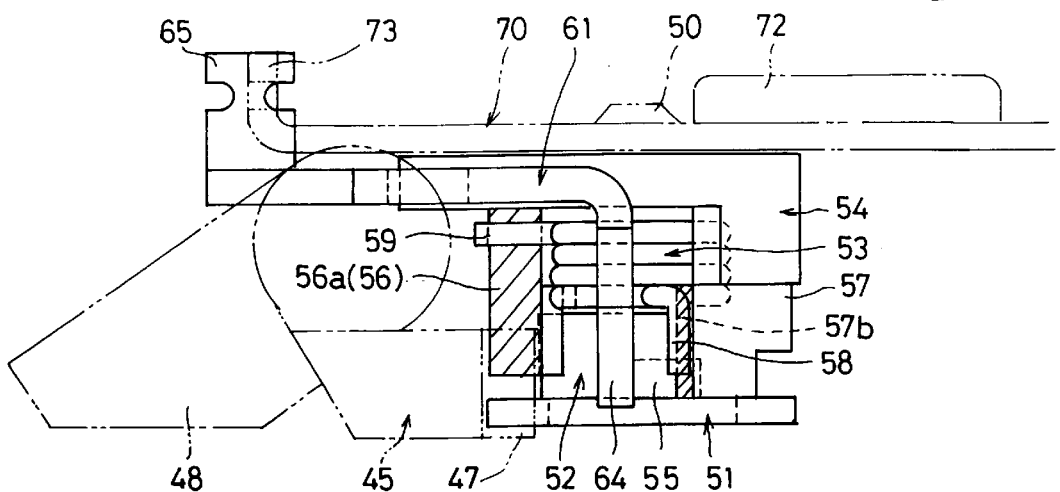
FIG. 6 is a view viewed from the direction indicated at an arrow VI in FIG. 5.
Figure 7:
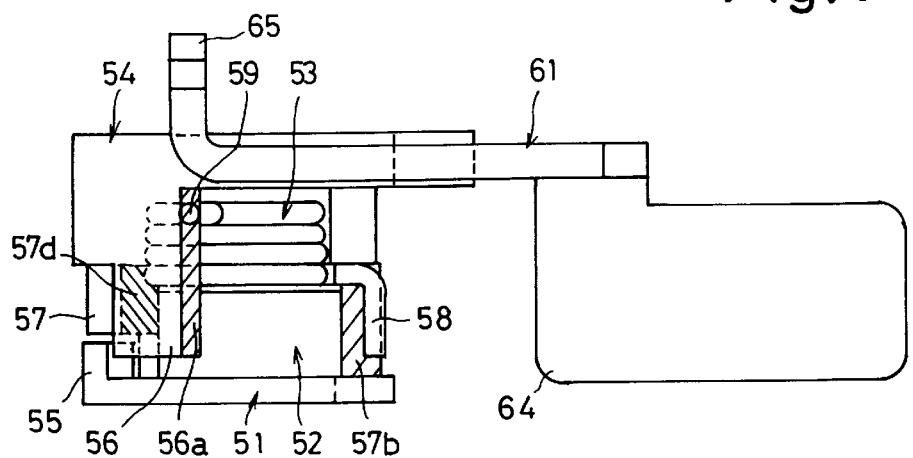
FIG. 7 is a view viewed from the direction indicated at an arrow VII in FIG. 5.
Figure 8:
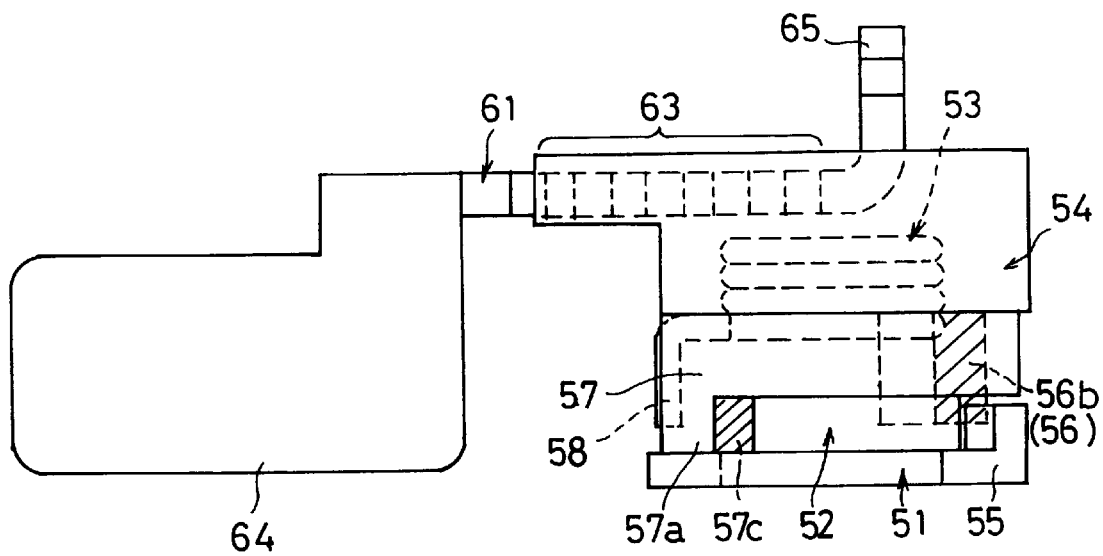
FIG. 8 is a view viewed from the direction indicated at an arrow VIII in FIG. 5.

The support 41 is provided thereon with a gear support shaft 50 in the vicinity of the drive-pin support member 42. The rack 47 engages with a first gear 51 supported by the gear support shaft 50. The gear support shaft 50 supports a clutch plate 52 on the first gear 51 and a second gear 54 on the clutch plate 52 (FIGS. 6 through 8). There is a clutch spring 53 between the clutch plate 52 and the second gear 54. The first gear 51 is equipped with an engaging projection 55 which projects toward the clutch plate 52 and the second gear 54 is equipped with an engaging projection 56 (hatched in FIGS. 5 and 9) which projects toward the clutch spring 53. The clutch plate 52 is provided with a semi-circular rib 57 which extends along substantially half the periphery thereof. The rib 57 defines at its one end a upright wall portion 57a (hatched in FIGS. 5 and 9) extending in the axial direction. The upright wall portion 57a is provided with an outer engagement surface 57b which defines the end face of the rib 57 and an inner engagement surface 57c opposite to the outer engagement surface 57b. The other end of the rib 57 defines an upright wall 57d.

Note that in a plan view, the elements located below the second gear 54, i.e., the first gear 51, the clutch plate 52, and the clutch spring 53, are indicated by solid lines to clarify the angular phase thereof.

Figure 9:
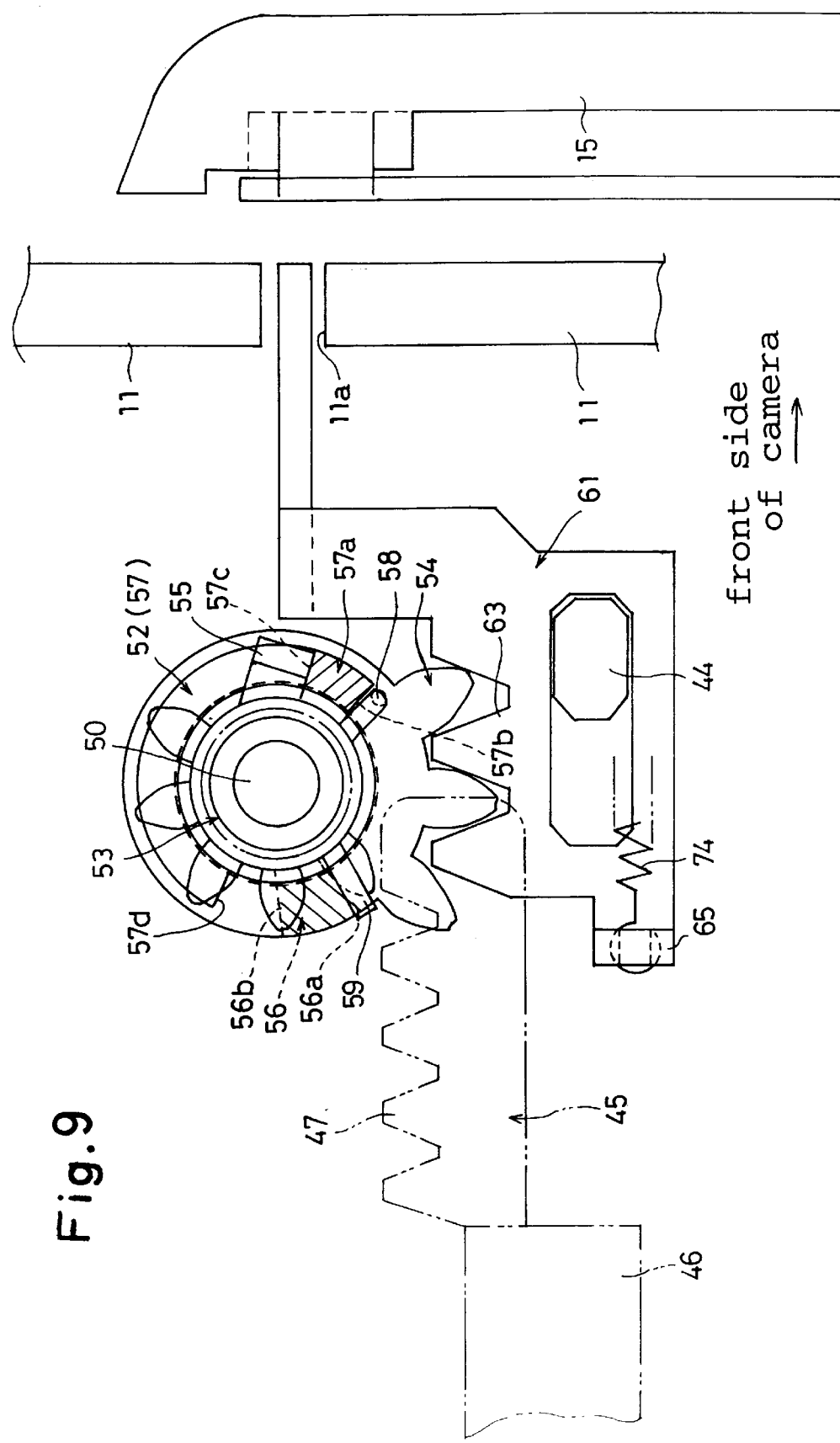
FIG. 9 is a plan view of a sliding movement locking apparatus shown in a retracted photographing-lens position.

The first gear 51 is not connected to the clutch plate 52 and is rotatable relative thereto. The height of the engagement projection 55 of the first gear 51 is such that it engages with the inner engagement surface 57c of the upright wall 57a. Consequently, the first gear 51 and the clutch plate 52 are relatively rotatable until the engagement projection 55 engages with the upright wall portion 57a. The clutch plate 52 and the second gear 54 are elastically interconnected under a spring force through the clutch spring 53. The clutch spring 53 is provided with an axial end 58 which extends in the axial direction and a radial end 59 which extends in the radial direction. The axial end 58 abuts against the outer engagement surface 57b of the clutch plate 52 and the radial end 59 engages with the front wall 56a of the engagement projection 56 of the second gear 54. The clutch spring 53 is disposed between the second gear 54 and the clutch plate 52 (FIGS. 6 and 7). The clutch spring 53 presses the engagement end 56 (rear wall 56b) of the second gear 54 against the upright wall 57d of the clutch plate 52, so that when no external force acts on each gear, the angular phase of the clutch plate 52 and the second gear 54 is maintained in the state shown in FIGS. 5 through 8. The clutch spring 53 can be deformed in a direction to move the axial end 58 close to the radial end 59. The largest deformation of the clutch spring 53 is shown in FIG. 9.

The support 41 is provided with a lock lever support member 43 having a movement restriction projection 44. A lock lever (sliding movement locking member) 61 is provided with a sliding hole 62 in which the movement restriction projection 44 is slidably fitted so as to move in a direction (forward and rearward direction of the camera) substantially parallel with the barrel drive-pin 45. The lock lever 61 is provided with a rack 63 which extends substantially parallel with the direction of the movement of the lock lever 61. The rack 63 engages with the second gear 54. Consequently, the rotation of the second gear 54 is associated with the movement of the lock lever 61. The lock lever 61 is equipped with an engagement plate 64 extending forward and a spring engagement portion 65 on the rear end of the lock lever 61. The range in which the lock lever 61 is moved is defined by the ends of the sliding hole 62 against which the movement restriction projection 44 abuts. The front and rear extremities of the movement of the lock lever 61 are shown in FIGS. 5 and 9, respectively. When the lock lever 61 is at the rear extremity, the engagement plate 64 is retracted in the camera body 11. When the lock lever 61 is moved forward, the engagement plate 64 protrudes from the opening 11a formed on the front surface of the camera body 11 to prevent the closure operation of the sliding cover 15. The front and rear extremities of the movement of the lock lever 61 will be referred to hereinafter as the locked position and the unlocked position, respectively.

A retainer plate 70 is provided on the lock lever 61 and the second gear 54. The retainer plate 70 is provided on the plate surface thereof with a through hole 71 in which a securing member 72 provided on the support 41 is fitted. The first gear 51, the clutch plate 52, the clutch spring 53, the second gear 54, the barrel drive-pin 45 and the lock lever 61 are retained in place by the retainer plate 70. The retainer plate 70 is provided with a spring engagement projection 73 which projects upward therefrom and which is connected to the spring engagement projection 65 of the lock lever 61 through a lock lever biasing spring 74. The lock lever biasing spring 74 is in the form of a linearly extending tensile spring which biases the lock lever 61 toward the locked position (forward movement extremity). The lock lever biasing spring 74 biases the second gear 54 in the counterclockwise direction in FIGS. 5 and 9 through the lock lever 61. The biasing force thereof is stronger than the spring force of the clutch spring 53 which connects the clutch plate 52 and the second gear 54 at the angular phase shown in FIG. 5 under a spring force.

As can be seen from the foregoing, the rack 47 of the barrel drive-pin 45 and the first gear 51 engaging therewith, and the rack 63 of the lock lever 61 and the second gear 54 engaging therewith constitute an association drive mechanism which functionally connects the zoom lens barrel 21 and the lock lever 61. The clutch plate 52 and the clutch spring 53 constitute a clutch mechanism which selectively establishes or breaks the connection between the first gear 51 and the second gear 54.

The sliding movement locking apparatus constructed as above operates as follows.

In FIG. 5, the sliding cover 15 (and the auxiliary sliding cover 14) is in the full-open position (FIG. 2), i.e., the zoom lens barrel 21 is moved to the photographing position (photographable position) and the lock lever 61 is in the locked position. The engagement plate 64 of the lock lever 61 projects from the through hole 11a of the camera body 11 to prevent the closure (downward sliding movement as viewed in FIG. 5) of the sliding cover 15 in the full-open position. Since the movement restriction projection 44 of the lock lever support member 43 abuts against the end of the sliding hole 62, the lock lever 61 cannot move forward in FIG. 5. The second gear 54 which engages with the rack 63 of the lock lever 61 is connected to the clutch plate 52 under a spring force at an angular phase in which the upright wall 57d is engaged by the rear wall 56b of the engagement projection 56 through the clutch spring 53. The first gear 51 which engages with the rack 47 of the barrel drive-pin 45 is stopped at an angular position in which the engagement projection 55 is spaced from the upright wall portion 57a of the clutch plate 52.

In this state, when the sliding cover 15 is slightly moved from the full-open position toward the closed position, the main switch is turned OFF, so that the zoom motor is driven to move the zoom lens barrel 21 (second lens barrel 23) to the retracted position from the photographing position. Consequently, the radial pin 48 is moved rearward by the pin fitting hole 24, so that the barrel drive-pin 45 is moved to the rear movement extremity (FIG. 9) in association with the second lens barrel 23. The first gear 51 is rotated in the clockwise direction in FIG. 5 through the rack 47 when the rearward movement of the barrel drive-pin 45 takes place. Since no element engages with the engagement projection 55 of the first gear 51 at the beginning stage of the rotation thereof, the first gear 51 rotates relative to the clutch plate 52 and the second gear 54 which are both stationary. When a predetermined amount of rotation of the first gear 51 occurs, the engagement projection 55 abuts against the upright wall 57*a* (inner engagement surface 57*c*) of the clutch plate 52. Consequently, the clutch plate 52 is pushed by the engagement-projection 55 and is rotated together with the first gear 51 in the clockwise direction. Since the force to bias the second gear 54 in the counterclockwise direction by the lock lever biasing spring 74 in FIG. 5 is stronger than the spring force of the clutch spring 53, a certain amount of deformation of the clutch spring 53 occurs. When maximum deformation of the clutch spring 53 occurs, the rotational force is transmitted to the second gear 54. The first gear 51 and the clutch plate 52 are rotated in the clockwise direction relative to the second gear 54 during the deformation of the clutch spring 53.

Therefore, while the barrel drive-pin 45 is moved rearward, the lock lever 61 is stopped at the locked position. Namely, the zoom lens barrel 21 is returned to the retracted position, but the closure of the sliding cover 15 is prevented.

When a predetermined amount of deformation (maximum deformation) of the clutch spring 53 occurs, the rotational force of the first gear 51 is transmitted to the second gear 54, so that the second gear 54 is rotated together with the first gear 51 in the clockwise direction against the biasing force of the lock lever biasing spring 74. When the second gear 54 is rotated in the clockwise direction, the lock lever 61 is slid rearward, so that the engagement plate 64 is retracted in the camera body 11. Namely, the lock of the sliding movement is released. When the zoom lens barrel 21 is returned to the retracted position, the sliding operation is unlocked, so that the sliding cover 15 (and the auxiliary sliding cover 14) can be moved to the closed position.

FIG. 9 shows a sliding movement locking apparatus in which the sliding cover 15 (and the auxiliary sliding cover 14) is in a closed position (FIG. 1), i.e., the zoom lens barrel 21 is in the retracted position and the lock lever 61 is in the unlocked position. Even if the barrel drive-pin 45 is in the rearward position and receives the spring force of the drive-pin biasing spring 49 in the direction to move the barrel drive-pin 45 forward, no advance of the barrel drive-pin 45 takes place since the radial projection 48 is held in the pin fitting hole 24 of the second lens barrel 23 which is in the retracted position. Therefore, the first gear 51 which engages with the rack 47 cannot be rotated in the counterclockwise direction. The engagement projection 55 of the first gear 51 abuts against the upright wall 57*a* (inner engagement surface 57*c*) of the clutch plate 52 when the zoom lens barrel 21 is returned to the retracted position, so that the clutch plate 52 and the second gear 54 are rotated together in the clockwise direction while deforming the clutch spring 53 by the maximum amount. If the rotation of the first gear 51 in the counterclockwise direction is restricted, the clutch plate 52 cannot be rotated in the same direction since the upright wall 57*a* (inner engagement surface 57*c*) abuts against the engagement projection 55. The relative position between the clutch member 52 and the second gear 54 is fixed as shown in FIG. 9 due to the largest amount of deflection of the clutch spring 53. No rotation of the second gear 54 in the counterclockwise direction takes place. Therefore, the lock lever 61 whose rack 63 engages with the second gear 54 cannot be moved forward by the biasing force of the lock lever biasing spring 74. Namely, the sliding movement is unlocked.

When the sliding cover 15 is moved from the closed position shown in FIG. 1 to the open position shown in FIG. 2, the main switch is turned ON and the zoom motor is driven to advance the zoom lens barrel 21 to the photographing position (wide-angle position). When the second lens barrel 23 of the zoom lens barrel 21 is advanced in the optical axis direction, the radial projection 48 is disengaged from the pin engaging hole 24, so that the barrel drive-pin 45 biased by the drive-pin biasing spring 49 is moved forward. Consequently, the first gear 51 which engages with the rack 47 is rotated in the counterclockwise direction in FIG. 9, i.e., in the direction in which the engagement projection 55 is moved away from the upright wall portion 57*a* (inner engagement surface 57*c*). This permits the clutch plate 52 and the second gear 54 to rotate in the counterclockwise direction. Consequently, the lock lever 61 which is biased by the lock lever biasing spring 74 is moved forward, and the second gear 54 which engages with the rack 63 is rotated in the counterclockwise direction in association with the first gear 51. As may be seen from the foregoing, since the lock lever 61 operates substantially simultaneously with the barrel drive-pin 45, the closure of the sliding cover 15 is prevented at substantially the same time as the forward movement of the zoom lens barrel 21 (second lens barrel 23). Moreover, the deflection of the clutch spring 53 is released, and hence the clutch plate 52 and the second gear 54 are returned to the phase position shown in FIG. 5.

The forward movement of the lock lever 61 stops when the movement restriction projection 44 of the lock lever support 43 abuts against the front end of the sliding hole 62, wherein the engagement plate 64 protrudes from the through hole 11*a* of the camera body 11. This is the locked position. Since the lock lever 61 cannot move forward beyond the locked position, the rotation of the second gear 54 in the counterclockwise direction is stopped. The first gear 51 which is associated with the barrel drive-pin 45 continues rotating until it reaches the position shown in FIG. 5.

In the movement of the zoom lens barrel 21 from the retracted position to the photographing position, the first gear 51 which is associated with the linear movement of the zoom lens barrel 21 and the second gear 54 which is associated with the lock lever 61 are rotated together without play, and hence, the lock lever 61 is moved substantially in association with the linear movement of the zoom lens barrel 21.

In the movement of the zoom lens barrel 21 from the photographing position to the retracted position, the first gear 51 is rotated relative to the second gear 52 which is stationary until maximum deformation of the clutch spring 53 occurs and thereafter the first gear 51 and the second gear 54 are rotated together. Consequently, the lock lever 61 begins moving toward the unlocked position after the zoom lens barrel 21 is moved rearward by a predetermined displacement toward the retracted position. As can be seen from the foregoing, since the movement of the barrel drive-pin 45 and the lock lever 61 are differentiated, the locking of the sliding movement of the sliding cover 15 is released after the zoom lens barrel 21 is retracted to a position in which no interference between the zoom lens barrel 21 and the sliding cover 15 (and the auxiliary sliding cover 14) occurs.

Figure 10:
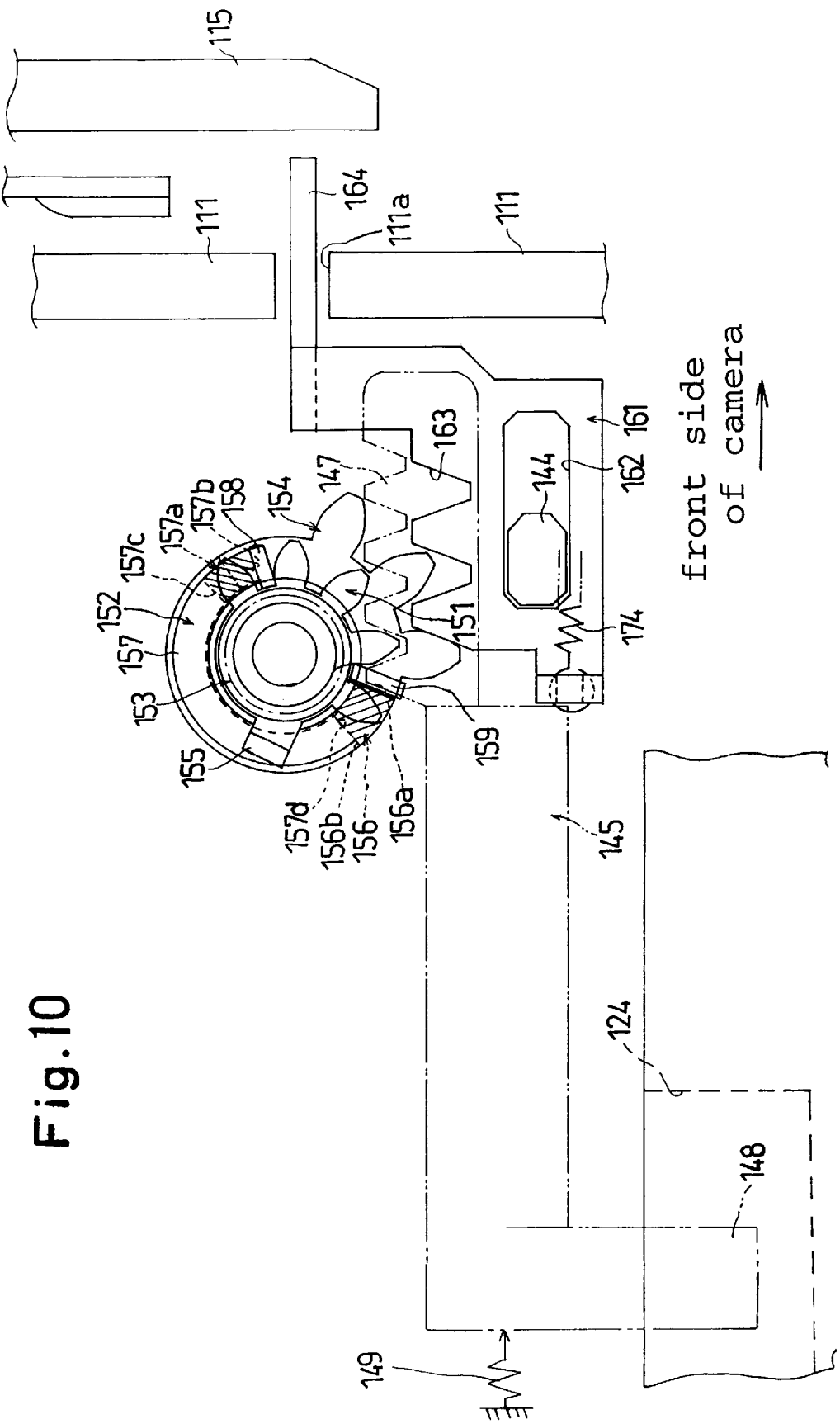
FIG. 10 is a plan view of a sliding movement locking apparatus shown in a photographing position according to another embodiment of the present invention.
Figure 11:
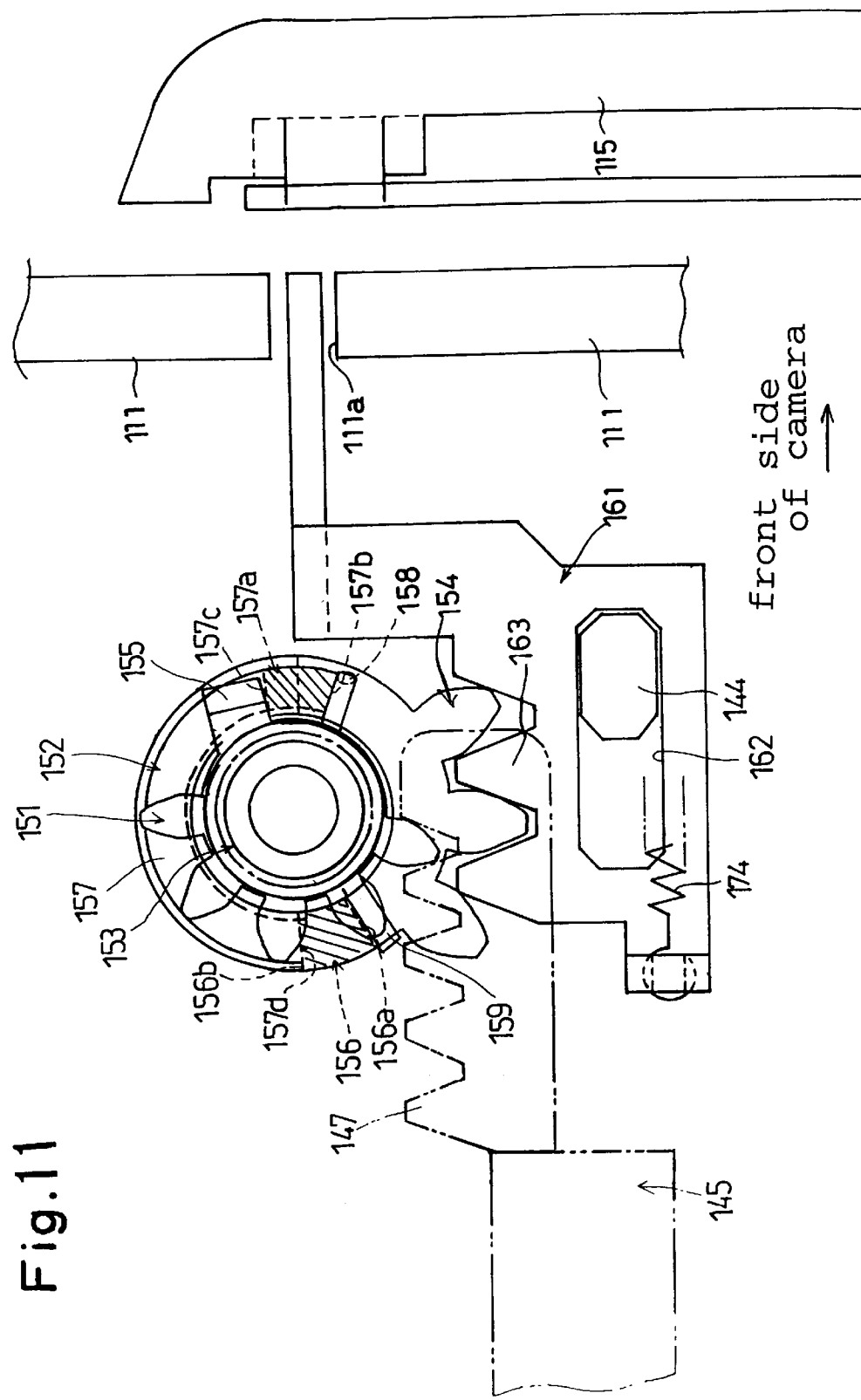
FIG. 11 is a plan view of a sliding movement locking apparatus of FIG. 10, shown in a retracted photographing-lens position.
Figure 12:
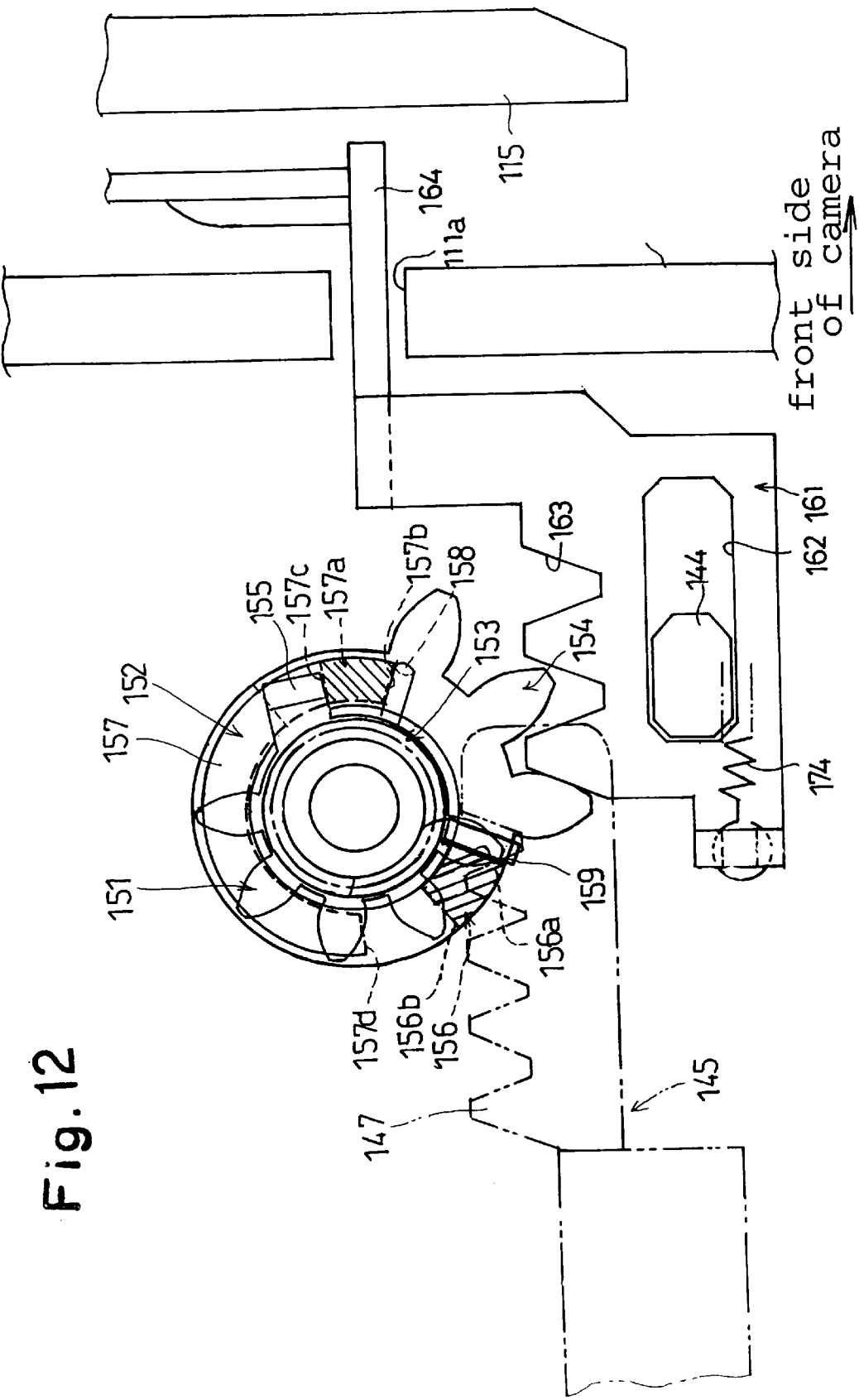
FIG. 12 is a plan view of a sliding movement locking apparatus when a sliding cover is forcedly slid in the closure direction.
Figure 13:
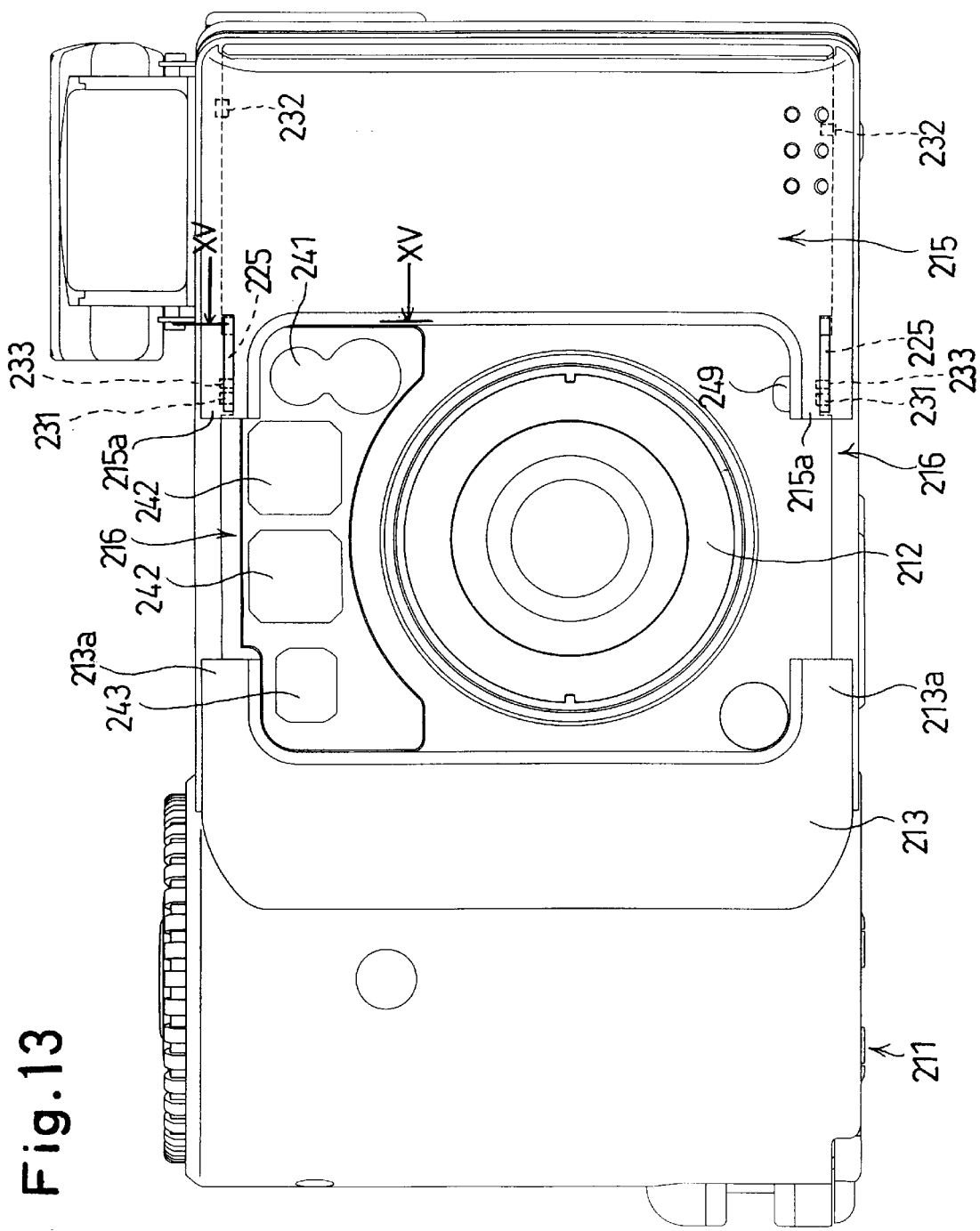
FIG. 13 is a front elevational view of a camera having a sliding movement locking apparatus when the sliding cover is opened.

FIGS. 10 through 12 show another embodiment of the sliding movement locking apparatus. This embodiment is basically similar to the embodiment shown in FIGS. 4 through 9. In the modified embodiment illustrated in FIGS. 10 through 12, the elements corresponding to those shown in FIGS. 4 through 9 are designated with like reference numerals plus 100 (e.g., the element 111 in FIGS. 10 through 12 corresponds to the element 11 in FIGS. 4 through 9).

In the modified embodiment, the spring force of the clutch spring 153 is stronger than the spring force of the lock lever biasing spring 174 unlike the first embodiment illustrated in FIGS. 4 through 9. The axial end 158 and the radial end 159 of the clutch spring 153 engage with the outer engagement surface 157b of the upright wall portion 157a and the front wall 156a of the engagement projection 156, respectively to thereby connect the clutch plate 152 and the second gear 154 under a spring force. The lock lever biasing spring 174 biases the lock lever 161 in the forward direction to thereby bias the second gear 154 in the counterclockwise direction through the lock lever 161. The sliding movement locking apparatus constructed above operates as follows.

In FIG. 10, the sliding cover 115 is in the full-open position. In this state, the main switch is ON; the zoom lens barrel 21 is moved to the photographing position; and the engagement plate 164 of the lock lever 161 protrudes from the through hole 111a of the camera body 111 (sliding movement locked position). Consequently, the closure of the sliding cover 115 (downward sliding movement) which is in the full-open position is prevented. The sliding movement restriction projection 144 abuts against one end of the sliding hole 162, so that the lock lever 161 cannot move forward beyond the position shown in FIG. 10. The second gear 154 which engages with the rack 163 of the lock lever 161 is elastically connected to the clutch plate 152 through the clutch spring 153 at the angular phase in which the rear wall 156b of the engagement projection 156 engages with the upright wall 157d. The first gear 151 which engages with the rack 147 of the barrel drive-pin 145 is stopped at an angular position in which the engagement projection 155 is located away from the upright portion 157a of the clutch plate 152.

In this state, when the sliding cover 115 is slightly moved from the full-open position toward the closed position, the main switch is turned OFF, so that the zoom motor is reversed to return the zoom lens barrel 121 (second lens barrel 123) to the retracted position from the photographing position. Consequently, the radial projection 148 is moved rearward by the pin engagement hole 124 and the barrel drive-pin 145 is slid rearward in association with the second lens barrel 123. When the barrel drive-pin 145 is moved rearward, the first gear 151 is rotated in the clockwise direction through the rack 147. Since no element engages with the engagement projection 155 of the first gear 151 at the beginning stage of the rotation thereof, the first gear 151 rotates relative to the clutch plate 152 and the second gear 154 which are both still. When a predetermined amount of rotation of the first gear 151 occurs, the engagement projection 155 abuts against the upright wall 157a (inner engagement surface 157c) of the clutch plate 152. Consequently, the clutch plate 152 is pushed by the engagement projection 155 and is rotated together with the first gear 151 in the clockwise direction. Since the force to bias the second gear 154 in the counterclockwise direction by the lock lever biasing spring 174 in FIG. 10 is weaker than the spring force of the clutch spring 153, the second gear 154 is rotated together with the clutch plate 152 and the first gear 151 in the clockwise direction against the biasing force of the lock lever biasing spring 174.

When the rotation of the second gear 154 in the clockwise direction takes place, the lock lever 161 is slid rearward, so that the engagement plate 164 is accommodated in the camera body 111. Namely, the lock of the sliding movement is released. When the zoom lens barrel 121 is returned to the retracted position, the sliding operation is unlocked, so that the sliding cover 115 can be moved to the closed position.

FIG. 11 shows a sliding movement locking apparatus in which the sliding cover 115 is in a closed position, i.e., the zoom lens barrel 121 is in the retracted position and the lock lever 161 is in the unlocked position. The barrel drive-pin 145 is in the rearward position and receives the spring force of the drive-pin biasing spring 149 in the direction to move the barrel drive-pin 145 forward, but no advance of the barrel drive-pin 145 takes place since the radial projection 148 is held in the pin fitting hole 124 of the second lens barrel 123 which is in the retracted position. Therefore, the first gear 151 which engages with the rack 147 cannot be rotated in the counterclockwise direction. The engagement projection 155 of the first gear 151 abuts against the upright wall 157a (inner engagement surface 157c) of the clutch plate 152 when the zoom lens barrel 121 is returned to the retracted position, so that the clutch plate 152 and the second gear 154 are rotated together in the clockwise direction. If the rotation of the first gear 151 in the counterclockwise direction is restricted, the clutch plate 152 cannot be rotated in the same direction since the upright wall 157a (inner engagement surface 157c) abuts against the engagement projection 155. Since the clutch plate 152 cannot rotate, the second gear 154 which is connected thereto under a spring force is held in the position shown in FIG. 11. Therefore, the lock lever 161 whose rack 163 engages with the second gear 154 cannot be moved forward by the biasing force of the lock lever biasing spring 174. Namely, the sliding movement is unlocked.

When the sliding cover 115 is moved to the open position, the main switch is turned ON and the zoom motor is driven to advance the zoom lens barrel 121 to the photographing position (wide-angle position). When the second lens barrel 123 of the zoom lens barrel 121 is advanced in the optical axis direction, the radial projection 148 is disengaged from the pin engaging hole 124, so that the barrel drive-pin 145 biased by the drive-pin biasing spring 149 is moved forward. Consequently, the first gear 151 which engages with the rack 147 is rotated in the counterclockwise direction in FIG. 11, i.e., in the direction in which the engagement projection 155 is moved away from the upright wall portion 157a (inner engagement surface 157c). This permits the clutch plate 152 and the second gear 154 to rotate in the counterclockwise direction. Consequently, the lock lever 161 which is biased by the lock lever biasing spring 174 is moved forward, and the second gear 154 which engages with the rack 163 is rotated in the counterclockwise direction in association with the first gear 151. As may be seen from the foregoing, since the lock lever 161 operates substantially simultaneously with the barrel drive-pin 145, the sliding movement of the sliding cover 115 is prevented at substantially the same time as the forward movement of the zoom lens barrel 121 (second lens barrel 123).

The forward movement of the lock lever 161 stops when the movement restriction projection 144 abuts against the front end of the sliding hole 162, wherein the engagement plate 164 protrudes from the through hole 111a of the camera body 111. This is the locked position. Since the lock lever 161 cannot move forward beyond the locked position, the rotation of the second gear 154 in the counterclockwise direction is stopped. The first gear 151 which is associated with the barrel drive-pin 145 continues rotating until the engagement projection 155 is moved away from the upright wall portion 157a of the clutch plate 152.

The above discussion has been directed to the normal operation of the sliding cover 115. The modified embodiment is different from the first embodiment in the point that no elastic deformation of the clutch spring 153 takes place when the lock lever 161 is moved rearward. There is no difference in the operation when the lock lever 161 is moved forward. The following discussion will be addressed to a forcible operation in which the sliding cover 115 is forcibly or suddenly closed.

In FIG. 10, when the sliding cover 115 is suddenly slid from the full-open position toward the closed position, the sliding cover 115 interferes with the engagement plate 164 of the lock lever 161, so that the lock lever 161 cannot be moved rearward. In this state, the main switch is OFF, and hence the zoom motor is driven to return the zoom lens barrel 121 (second lens barrel 123) rearward to the retracted position from the photographing position. Consequently, the radial projection 148 is moved rearward by the pin fitting hole 124, so that the barrel drive-pin 145 is slid rearward in association with the second lens barrel 123. When the rearward movement of the barrel drive-pin 145 takes place, the first gear 151 is rotated in the clockwise direction in FIG. 10 through the rack 147. When a certain amount of rotation of the first gear 151 occurs, the engagement projection 155 abuts against the upright wall portion 157a (inner engagement surface 157c) of the clutch plate 152, so that the rotation in the clockwise direction can be transmitted to the clutch plate 152.

The lock lever 161 is held in the locked position since the engagement plate 164 interferes with the sliding cover 115, and hence no movement of the lock lever to the unlocked position takes place. Consequently, the second gear 154 which engages with the rack 163 cannot rotate in the clockwise direction in FIG. 10. The second gear 154 is connected to the clutch plate 152 under a spring force through the clutch spring 153 and the clutch plate 152 receives the rotational force in the clockwise direction due to the rearward movement of the zoom lens barrel 121. Namely, the clutch plate 152 tends to rotate but the second gear 154 cannot rotate. If the rearward movement of the zoom lens barrel 121 continues, the clutch spring 153 is deflected in the direction to move the axial end 158 close to the radial end 159, so that the clutch plate 152 is rotated relative to the second gear 154 in the direction to move the upright wall portion 157d away from the engagement end 156 (rear wall 156b). As a result of the relative rotation, the force caused by the movement of the zoom lens barrel 121 is absorbed, so that the zoom lens barrel 121 can be returned to the retracted position in spite of the impossible rearward movement of the lock lever 161 (FIG. 12).

If the forcible operation is released, and consequently the engagement plate 164 of the lock lever 161 no longer interferes with the sliding cover 115, the lock lever 161 can be moved to the unlocked position. Since the spring force of the clutch spring 153 is stronger than the spring force of the lock lever biasing spring 174 acting on the lock lever 161, the force to release the deflection of the clutch spring 153 causes the second gear 154 to rotate in the clockwise direction in FIG. 12 to thereby move the lock lever 161 from the locked position to the unlocked position. When the clutch spring 153 becomes free, the clutch plate 152 and the second gear 154 are returned to the angular phase position shown in FIG. 11 in which the engagement end 156 engages with the upright wall portion 157d.

Although the lock lever 161 is locked in the locked position when an abnormal operation of the sliding cover 115 takes place in the above discussion, the present invention is not limited thereto. For instance, if the lock lever 161 cannot be moved from the unlocked position or an intermediate position for other reasons, it is possible to prevent the elements from being broken by deflecting the clutch spring 153 according to the present invention.

Although the photographing lenses in the abovementioned embodiments are zoom lenses, the present invention can be equally applied to a fixed focus type photographing lens which is moved between the retracted position and the photographing position.

Figure 14:
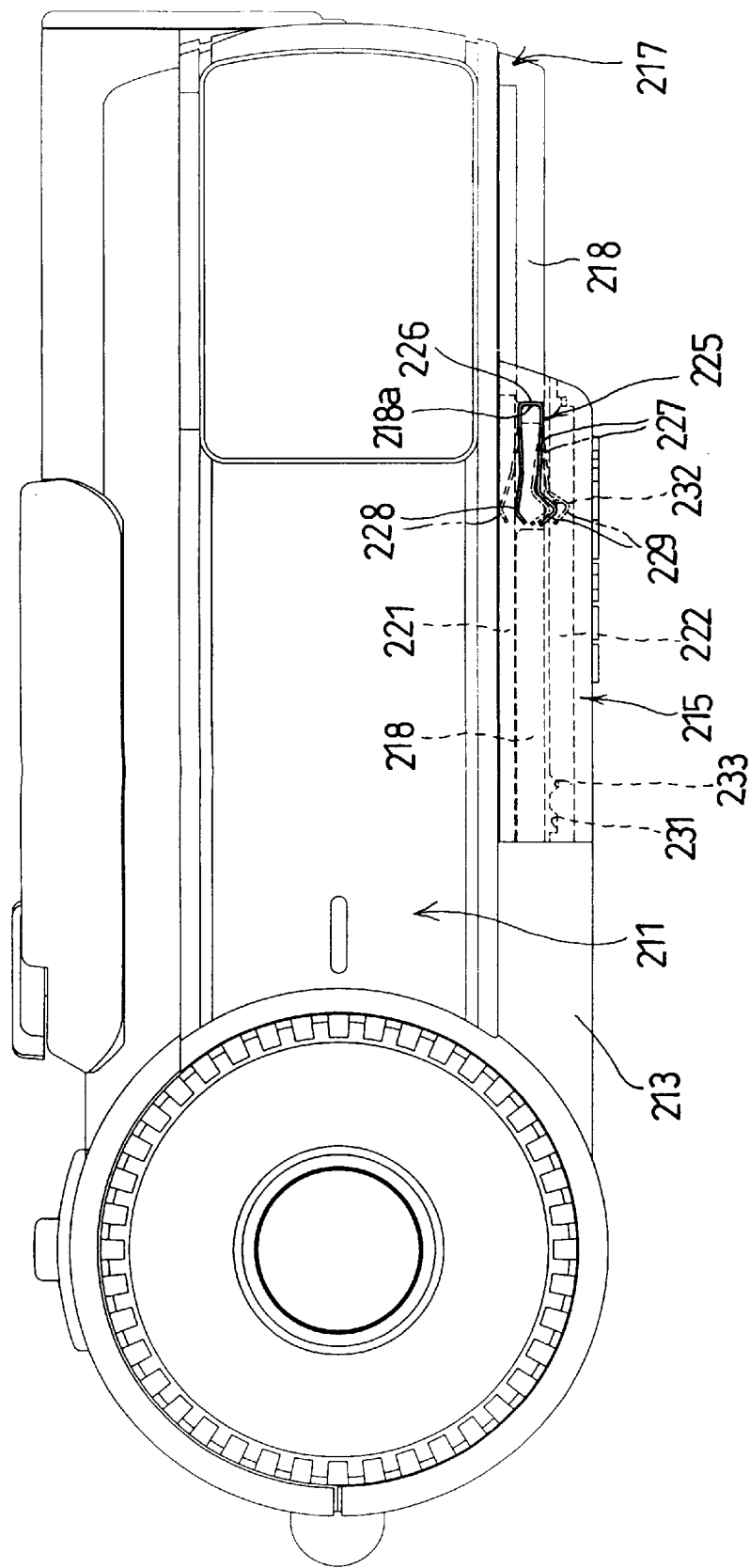
FIG. 14 is a partial perspective plan view of a camera of FIG. 13 when a sliding cover is closed.
Figure 15:
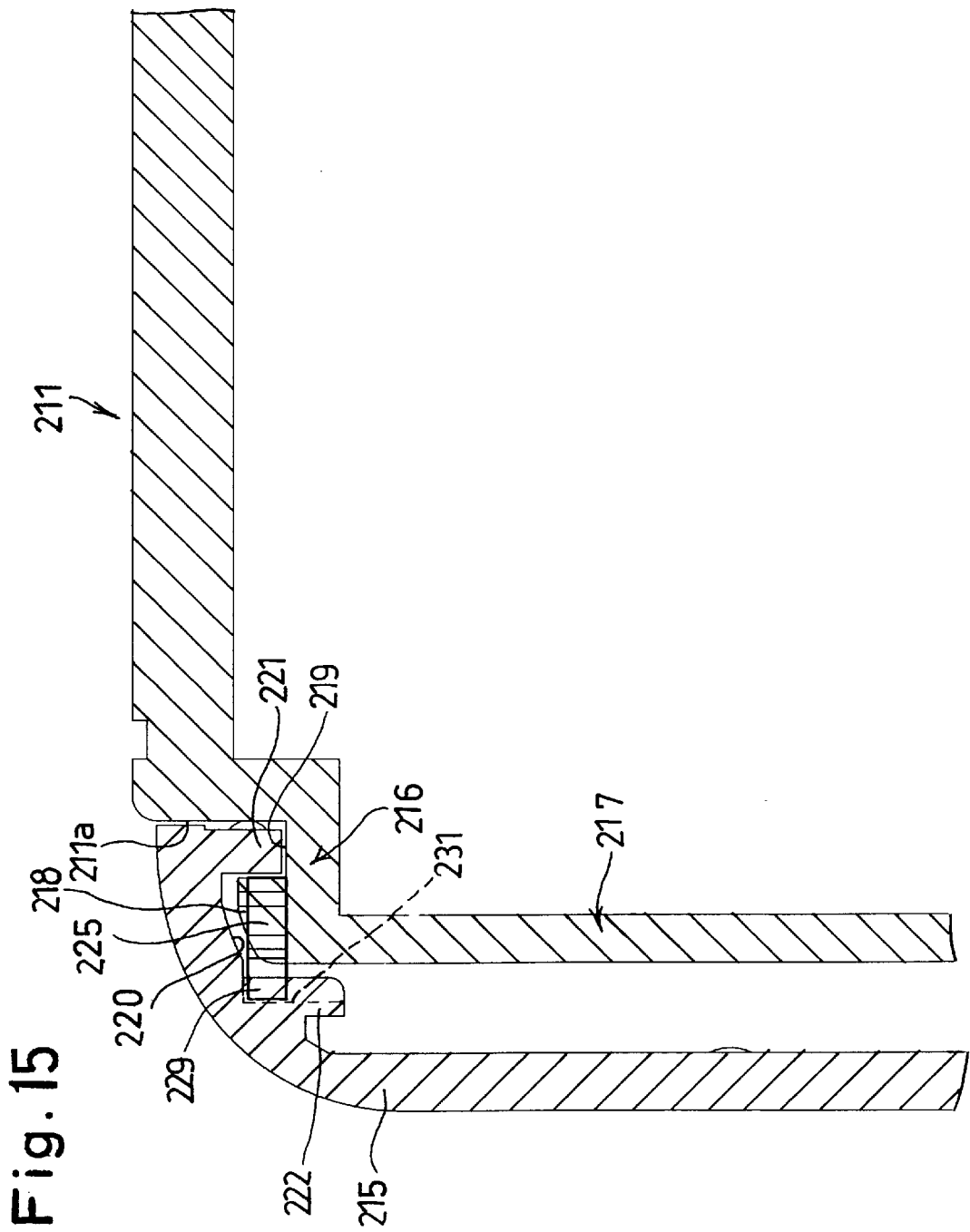
FIG. 15 is a sectional view taken along the line XV—XV in FIG. 13.
Figure 16:
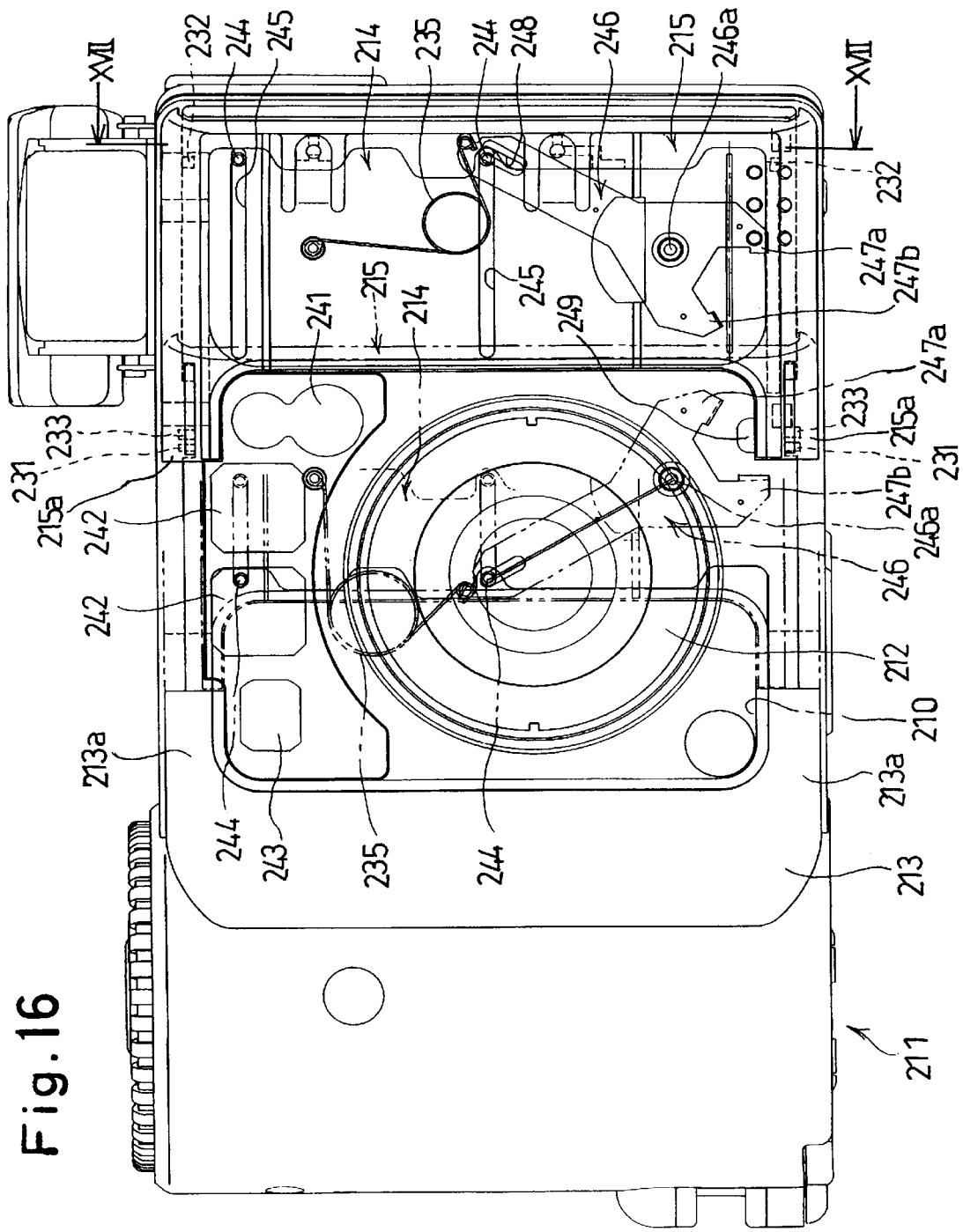
FIG. 16 is a partial perspective front elevational view of a camera to show an association state between a main sliding cover and an auxiliary sliding cover.

The subject of the present invention is also addressed to a click stop mechanism of the sliding cover which will be discussed below with reference to FIGS. 13 through 18. Similarly to the aforementioned embodiments, the camera is provided with a zoom lens barrel 212 on the center portion of the front surface of the laterally elongated camera body 211. The zoom lens barrel 212 is of a collapsible type in which it is movable between the retracted position in which it is accommodated in the camera body 211 and the photographing position (photographable position) in which the zoom lens barrel protrudes outward from the camera body. The camera body 211 is provided on its front surface with a stationary cover 213, an auxiliary sliding cover 214, and a main sliding cover 215 to protect the zoom lens barrel 212 retracted in the camera body. The stationary cover 213 is secured to the camera body 211 and the main sliding cover 215 is supported to move in the longitudinal direction of the camera body 211 along a pair of upper and lower sliding guide portions 216 provided on the front surface of the camera body. The stationary cover 213 and the main sliding cover 215 are each provided with a substantially rectangular cut-away portion opposed to the zoom lens barrel 212 to exhibit a generally U-shape, so that when the main sliding cover 215 is closed, the upper and lower projections 213a and 215a thereof come into contact with each other to define a vertically elongated rectangular opening 210 (FIG. 16). The latter is closed by the auxiliary sliding cover 214 which is slidably attached to the rear surface of the main sliding cover 215. The auxiliary sliding cover 214 is associated with the main sliding cover 215. When the main sliding cover 215 is moved to the open position, the zoom lens barrel 212 can be exposed between the stationary cover 213 and the main sliding cover 215.

The main sliding cover 215 will be explained below in detail. The main sliding cover 215 is attached to the sliding guide portions 216 as shown in FIG. 15. The camera body 211 is provided on the front surface thereof with a stepped portion 217 which is provided on the upper and lower ends thereof with a pair of guide rails 218 extending in the longitudinal direction of the camera body 211. Note that in FIGS. 14 and 15, only the upper guide rail 218 is shown.

The main sliding cover 215 is provided on the upper and lower edges of the back surface thereof with portions 220, opposed to the upper and lower surfaces of the stepped portion 217. The upper and lower portions 220 to be guided are each provided with first and second sliding contact portions 221 and 222 that extend in parallel with the longitudinal direction of the main sliding cover 215. The distance between the first and second sliding contact portions 221 and 222 is larger than the width of the corresponding guide rail 218, so that the latter is disposed between the first and second sliding contact portions. The first sliding contact portions 221 are fitted in grooves 219 formed between the front plate 211a of the camera body 211 and the guide rails 218. The second sliding contact portions 222 are adjacent to the other surfaces of the guide rails 218. Thus, the main sliding cover 215 engages with the stepped portion 217 of the camera body 211 so as to move along the guide rails 218 without being slipped-off therefrom in the longitudinal direction of the camera body 211. The second sliding contact portion 222 on the back surface of the main sliding cover 215 is provided with opening and closing click holes 231 and 232 which are spaced from one another and which define the open position and the closed position of the main sliding cover 215, respectively.

The camera body 211 is provided with spring receiving holes 218a which are formed by partially cutting away the upper and lower guide rails 218. A pair of generally U-shaped leaf springs 225 are received in the pair of spring receiving holes 218a (FIG. 14). The spring receiving holes 218a are located behind the pair of projections (extensions) 215a when the main sliding cover 215 is in the open position and are located behind the body portion of the main sliding cover 215 when the latter is in the closed position. Namely, the pair of spring receiving holes 218a are not exposed to the outside either at the open position or closed position of the main sliding cover 215.

The pair of leaf springs 225 are each provided with a bent portion 226, an elastically deformable portion 227 and a deformation support portion 228 which is opposed to the elastically deformable portion 227. The elastically deformable portion 227 and the deformation support portion 228 are provided on the front ends thereof with convex portions bent in opposite directions. When the leaf springs 225 are mounted in the spring receiving holes 218a, the bent portions 226 abut against the end surfaces of the holes 218a and the elastically deformable portions 227 and the deformation support portions 228 extend along the length of the guide rails 218. The leaf spring 225 is shown at a two-dotted and dashed line in FIG. 14 in its free state. Also, in the free state, the distance between the elastically deformable portion 227 and the deformation support portion 228 is larger than the distance between the first and second sliding contact portions 221 and 222. When the main sliding cover 215 is mounted, the elastically deformable portion 227 and the deformation support portion 228 are held between the first and second sliding contact portions 221 and 222 and are elastically deformed, as indicated by solid lines in FIG. 14. Consequently, the convexly bent portion of the deformation support portion 228 is brought into spring-contact with the first sliding contact portion 221 on the camera side. The convexly bent portion (stop portion) 229 of the elastically deformable portion 227 is brought into spring-contact with the second sliding contact portion 222 on the main sliding cover side and is engageable in the upper and lower click holes 231 and 232 formed in the main sliding cover 215. Since the elastically deformable portion 227 and the deformation support portion 228 are brought into spring-contact with the first and second sliding contact portions 221 and 222, frictional force is produced between the main sliding cover 215 and the camera body 211. Thus, the main sliding cover 215 is smoothly guided by the guide rails 218 without play therebetween.

When the main sliding cover 215 is moved to a position in which the upper and lower click holes 231 or 232 are registered with the leaf springs 225, the elastically deformable portions 227 of the leaf springs 225 can be returned to the initial position. Namely, the convexly bent portions 229 are engaged in the click holes 231 or 232. Consequently, the main sliding cover 215 is clicked. When the convexly bent portions 229 are engaged in the upper and lower click holes 231, the main sliding cover 215 is in the open position in which the zoom lens barrel 212 is exposed, and when the convexly bent portions 229 are engaged in the upper and lower click holes 232, the main sliding cover 215 is in the closed position in which the extensions (projections) 215a abut against the extensions (projections) 213a of the stationary cover 213, respectively.

The click holes 231 and 232 are generally triangular in cross section, so that when a predetermined sliding force is applied to the main sliding cover 215 at each click position, the main sliding cover 215 can be disengaged and moved. Moreover, there are third click holes 233 adjacent the opening click holes 231. When the main sliding cover 215 is moved from the open position toward the closed position, the convexly bent portions 229 of the leaf springs 225 are disengaged from the click holes 231 and thereafter are engaged in the third click holes 233. When the convexly bent portions 229 are engaged in the third click holes 233, the main sliding cover 215 is located in a position immediately before the interference position in which it interferes with the lens barrel 212. Thus, a user can be warned so as to prevent an occurrence of the interference between the main sliding cover 215 and the lens barrel 212.

Figure 17:
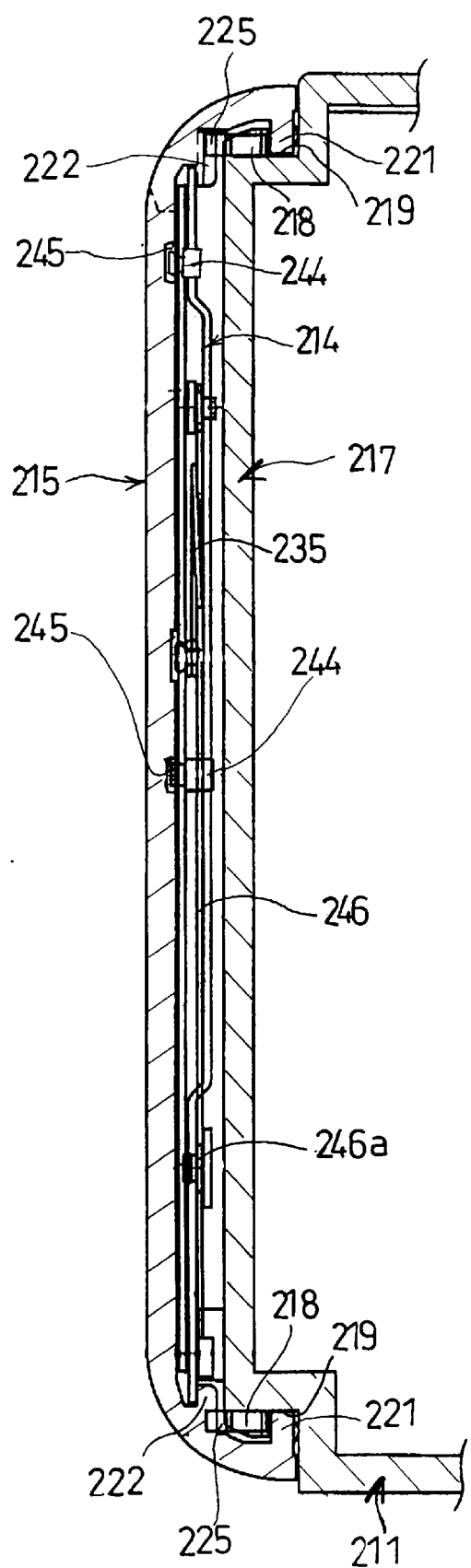
FIG. 17 is a sectional view taken along the line XVII—XVII in FIG. 16.

The auxiliary sliding cover 214 will be explained below with reference to FIGS. 16 and 17. The auxiliary sliding cover 214 is made of a plate member which can be retracted behind the main sliding cover 215. The length or width of the auxiliary sliding cover 214 in the direction perpendicular to the direction of the movement of the main sliding cover 215 is smaller than the distance between the guide rails 218. The auxiliary sliding cover 214 is provided on its one end with a pair of pins 244 extending toward the main sliding cover 215. The main sliding cover 215 is provided on its rear surface with a pair of guide grooves 245 which extend in the direction of the movement thereof. The pins 244 are slidably fitted in the guide grooves 245. Consequently, the auxiliary sliding cover 214 is movable relative to the main sliding cover 215 in the direction of the movement of the main sliding cover 215. In FIG. 16, the amount of overlap between the auxiliary sliding cover 214 and the main sliding cover 215 is maximum when the pins 244 abut against the right ends (i.e., outer ends adjacent the side surface of the camera body 211) of the guide grooves 245. Conversely, the amount of overlap between the auxiliary sliding cover 214 and the main sliding cover 215 is minimum when the pins 244 abut against the left ends (i.e., inner ends far from the side surface of the camera body 211) of the guide grooves 245. The auxiliary sliding cover 214 is retracted in the space on the back side of the main sliding cover 215 and is not exposed to the outside in the maximum overlap state.

An association lever 246 is provided on the back surface of the main sliding cover 215 to rotate about a shaft 246a. The association lever 246 is provided with opposed arms 247a and 247b adjacent the shaft 246a, and an elongated hole 248 on the other end of the association lever 246. One of the pins 244 is fitted in the elongated hole 248. The camera body 211 is provided, on the lower end of the front surface thereof, with a projection 249. The projection 249 is selectively engaged by the arms 247a or 247b of the association lever 246 when the main sliding cover 215 is slid. The torsion spring 235 is connected at its opposite ends to the main sliding cover 215 and the auxiliary sliding cover 215. The torsion spring 235 changes in the direction of the biasing force to bias the auxiliary sliding cover 214 toward the maximum overlap position or the minimum overlap position at a predetermined point of action. Thus, the auxiliary sliding cover 214 can be moved in association with the main sliding cover 215 in the same direction.

The camera includes the main switch (not shown) which is actuated immediately before the main sliding cover 215 reaches the open position from the closed position or when the main sliding cover 215 is slightly moved from the open position toward the closed position. The main switch is turned ON immediately before the main sliding cover 215 comes to the open position from the closed position and is turned OFF when the main sliding cover 215 is slightly moved from the open position toward the closed position. When the main switch is turned ON, the zoom motor is driven in the forward direction to move the photographing lens barrel 212 to the photographing position. When the main switch is turned OFF, the zoom motor is reversed to move the zoom lens barrel 212 to the retracted position.

The operation of the sliding movement locking apparatus and the association of the main sliding cover 215 and the auxiliary sliding cover 214 will be discussed below with reference to FIG. 16. When the main sliding cover 215 is in the open position (indicated by a solid line in FIG. 16), the auxiliary sliding cover 214 is held in a position in which the pins 244 abut against the right ends of the corresponding guide grooves 245 by the spring force of the torsion spring 235. Namely, the auxiliary sliding cover 214 is retracted behind the main sliding cover 215. In this state, the association lever 246 of which one of the pins 244 is fitted in the elongated hole 248 is located in an angular position in which the end of the association lever 246 adjacent the elongated hole 248 is located close to the side surface of the camera body 211. When the main sliding cover 215 and the auxiliary sliding cover 214 are open, the lens barrel 215, the photometering window 241, the focusing window 242, and the finder opening 243 are exposed.

When the main sliding cover 215 is moved from the open position toward the closed position, the convexly bent portions 229 of the leaf springs 225 are disengaged from the opening click holes 231 and are thereafter engaged in the third click holes 233. In this position, the main switch of the camera is turned OFF, so that the zoom lens barrel 212 can be retracted. Since the main sliding cover 215 is clicked due to the third click holes 233, there is no interference between the zoom lens barrel 212 and the main sliding cover 215 even if the main sliding cover 215 is suddenly or forcibly moved toward the closed position.

If a further movement of the main sliding cover 215 toward the closed position occurs, the arm 247a of the association lever 246 engages with the projection 249 of the camera body 211 slightly before the convexly bent ends 229 of the leaf springs 225 are engaged in the closing click holes 232. Consequently, the association lever 246 is rotated about the axis of the shaft 246a in the counterclockwise direction due to the force produced by the movement of the main sliding cover 215 in FIG. 16. As a result, the pin 244 is moved down, so that the auxiliary sliding cover 214 is moved in the sliding direction of the main sliding cover 215 relative to the latter while being guided by the guide grooves 245 to reduce the amount of overlap between the main sliding cover and the auxiliary sliding cover. Consequently, the auxiliary sliding cover 214 is protruded from between the extensions 215a toward the stationary cover 213. When the relative movement between the main sliding cover 215 and the auxiliary sliding cover 214 becomes more than a certain amount, the auxiliary sliding cover 214 is slid beyond the point of action of the torsion spring 235 until the pins 244 abut against the left ends of the guide grooves 245.

When the convexly bent ends 229 of the leaf springs 225 engage with the closing click holes 232, the main sliding cover 215 is moved to the closed position (indicated as a two-dotted and dashed line in FIG. 16) in which the extensions 215a abut against the extensions (projections) 213a of the stationary cover 213. Consequently, the auxiliary sliding cover 214 projects from the back surface of the main sliding cover 215 toward the stationary cover 213 to close the vertically elongated rectangular opening 210 defined between the stationary cover 213 and the main sliding cover 215.

When the main sliding cover 215 is moved from the closed position to the open position, the operation opposite to the foregoing is carried out. Namely, when the convexly bent ends 229 of the leaf springs 225 are disengaged from the closing click springs 232 and a certain amount of displacement of the main sliding cover 215 toward the open position takes place, the arm 247b of the association lever 246 engages with the projection 249 of the camera body 211, so that the association lever 246 is rotated in the clockwise direction in FIG. 16 due to the force produced by the movement of the main sliding cover 215. Consequently, the auxiliary sliding cover 214 is relatively moved in the direction (right hand direction in FIG. 16) to increase the amount of overlap between the main sliding cover 215 and the auxiliary sliding cover 214. If the movement continues beyond the point of action of the torsion spring 235, the direction of the biasing force changes into the direction in which the auxiliary sliding cover 214 is retracted into the space on the back side of the main sliding cover 215. The main switch of the camera is turned ON immediately before the convexly bent ends 229 of the leaf springs 225 engage with the opening click holes 231, so that the zoom lens barrel 212 is advanced to the photographing position without interfering with the main sliding cover 215 or the auxiliary sliding cover 214.

As can be understood from the above discussion, since friction is given to the movement of the main sliding cover 215, and the leaf springs 225 with which the main sliding cover 215 engages at the open position and the closed position are provided in the upper and lower guide rails 218 provided above and below the lens barrel 212, no overlap portion is needed in the front portion of the camera body 211. Therefore, the camera body 211 can be miniaturized. Moreover, since the auxiliary sliding cover 214 is always moved in the area out of the guide rails 218, if the auxiliary sliding cover 214 is elongated in the direction of the sliding movement thereof, it is possible to provide the leaf springs 225 in the guide rails 218. Hence, the displacement of the main sliding cover 215 can be reduced. Also, in the illustrated embodiments, since the main sliding cover 215 has a pair of extensions or projections 215a, the auxiliary sliding cover 214 moves by the displacement corresponding to the length of the extensions 215a. The spring receiving holes 218a are located behind the extensions 215a when the main sliding cover 215 is open. This arrangement also contributes to the miniaturization of the main sliding cover 215.

Figure 18:
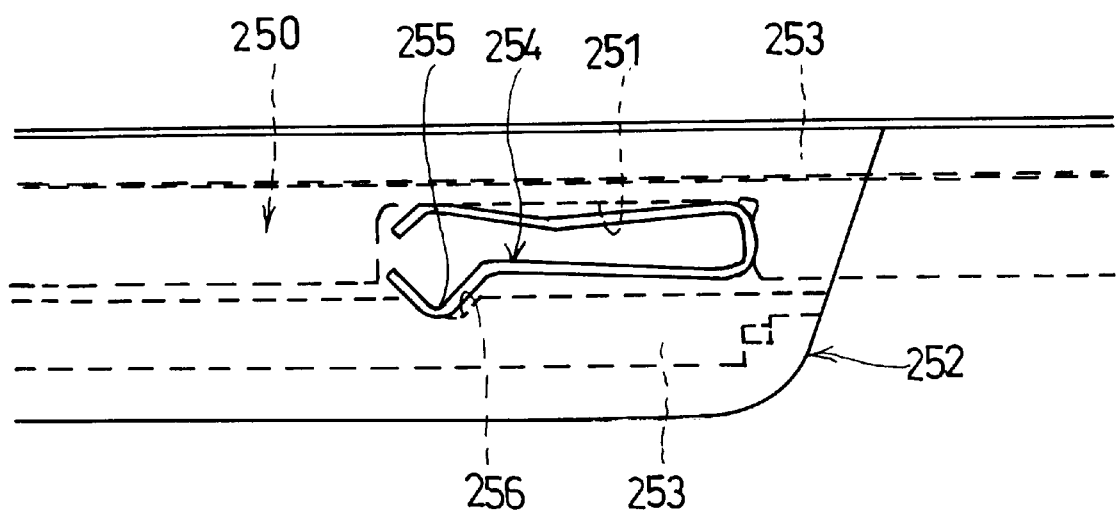
FIG. 18 is a plan view of a click stop mechanism of a sliding cover according to another embodiment of the present invention.

FIG. 18 shows another embodiment of the click stop mechanism. The spring receiving groove 251 formed in the guide rail 250 opens into only one of a pair of sliding portions 253 of the sliding cover 252. The leaf spring 254 is provided with a convexly bent end 255 which is opposed to the opening and which is received in the spring receiving groove 251. With this arrangement, since the leaf spring 254 comes into contact with one of the sliding portions 253 under a spring force, not only can friction be given to the sliding cover 252, but also the convexly bent portion 255 can be engaged in the click hole 256 formed in the sliding cover 252.

Although the above discussion has been directed to a double cover consisting of a main cover and an auxiliary cover which can be retracted behind the main cover, the present invention can be applied to a sliding movement locking apparatus having a single sliding cover. Namely, in the case of a single sliding cover, a leaf spring for clicking and giving a frictional force is provided in a guide rail along which the sliding cover is guided, so that no overlap portion is needed in front of the camera body, and thus facilitating the miniaturization of the camera.

As may be seen from the above discussion, according to the present invention, in a camera in which the power source is turned ON or OFF in accordance with the opening and closing operation of the sliding cover to move the photographing lens between a retracted position and a photographing position, a sliding movement locking apparatus for the sliding cover in which the lock can be released without an interference between the photographing lens and the sliding cover can be provided. Moreover, a sliding operation locking apparatus for a sliding cover in which there is no danger of the elements being broken by the forcible operation of the sliding cover can be provided. Furthermore, according to the present invention, a simple sliding movement locking apparatus in which no overlapping space is needed in the front portion of the camera body, thus facilitating the miniaturization of an associated camera.

What is claimed is:

1. A sliding movement locking apparatus for a sliding cover of a camera comprising:

a lens barrel which is movable between a photographing position and a retracted position;

a sliding cover which can be moved in front of said lens barrel which is in said retracted position;

a drive member which is moved in the forward and rearward direction of said camera in association with the movement of said lens barrel between said photographing position and said retracted position, said drive member being provided with a rack, a first gear which engages with said rack of said drive member;

a second gear coaxial to said first gear, which is rotatable relative to said first gear;

a sliding movement locking member which is provided with a rack which engages with said second gear and which is moved in the forward and rearward direction of said camera in accordance with the rotation of said second gear to prevent the closure of said sliding cover when said locking member is at the forward extremity; and a clutch mechanism provided between said first and second gears for rotating said first and second gears together without play therebetween when said lens barrel is moved from said retracted position to said photographing position, and for initially rotating said first gear by a predetermined angle and thereafter rotating said first and second gears together when said lens barrel is moved from said photographing position to said retracted position.

2. A sliding movement locking apparatus according to claim 1, further comprising:

a projection which projects in the axial direction of said first gear;

a rotatable clutch member coaxial to said first gear, which is provided with an upright wall portion which can be engaged and disengaged by said projection;

a coil spring which elastically connects said clutch member and said second gear under a spring force at a predetermined angular phase; and a linearly extending biasing spring which biases said locking member toward the forward extremity of movement;

wherein said first gear and said clutch member are located at an angular phase position in which said projection is disengaged from said upright wall portion when said lens barrel is in said photographing position;

said first gear is rotated relative to said clutch member until said projection engages with said upright wall portion when said lens barrel is moved from said photographing position to said retracted position, and thereafter said clutch member is rotated relative to said second gear until a predetermined amount of deflection of said coil spring is produced;

said first gear is rotated in a direction to move said projection away from said upright wall portion and said second gear which engages with said rack of said locking member is rotated in the same direction in association with the rotation of said first gear by the spring force of said linearly extending biasing spring when said lens barrel is moved from said retracted position to said photographing position.

3. A sliding movement locking apparatus according to claim 2, wherein the spring force of said linearly extending biasing spring which biases said second gear in the direction to move said locking member toward the forward extremity of movement is stronger than the spring force of said coil spring which connects said clutch member and said second gear under said spring force.

4. A sliding movement locking apparatus according to claim 3, wherein when the movement of said lens barrel from said retracted position to said photographing position takes place, said drive member and said locking member are moved together to said forward extremity of movement, and when the movement of said lens barrel from said photographing position to said retracted position takes place, said drive member is moved together with said lens barrel to the rearward extremity of movement and said locking member begins moving rearward when said drive member has moved by a predetermined displacement.

5. A sliding movement locking apparatus for a sliding cover of a camera comprising:

a lens barrel which is movable between a photographing position and a retracted position;

a sliding cover which can be moved in front of said lens barrel which is in said retracted position;

a drive member which is moved in the forward and rearward direction of said camera in association with the movement of said lens barrel between said photographing position and said retracted position, said drive member being provided with a rack;

a first gear which engages with said rack of said drive member;

a second gear coaxial to said first gear, which is rotatable relative to said first gear;

a sliding movement locking member which is provided with a rack which engages with said second gear and which is moved in the forward and rearward direction of said camera in accordance with the rotation of said second gear to prevent the closure of said sliding cover when said locking member is at the forward extremity of movement; and a clutch mechanism provided between said first and second gears, said clutch mechanism rotates said first and second gears together after a predetermined angle of rotation of said first gear in a normal state in which said locking member is movable in the rearward direction in association with the movement of said lens barrel from said photographing position to said retracted position, and said clutch mechanism rotates said first gear without rotating said second gear even after said first gear rotates beyond said predetermined angle of rotation so that said first gear only rotates to thereby permit said lens barrel to move in an abnormal state in which said locking member cannot move in the rearward direction in association with the movement of said lens barrel from said photographing position to said retracted position.

6. A sliding movement locking apparatus according to claim 5, further comprising:

a projection which projects in the axial direction of said first gear;

a rotatable clutch member coaxial to said first gear, said rotatable clutch member being provided with an upright wall portion which can be engaged or disengaged by said projection;

a coil spring which connects said clutch member and said second gear under a spring force at a predetermined angular phase; and a linearly extending biasing spring which biases said locking member toward the forward extremity of movement;

wherein said first gear and said clutch member are located at an angular phase position in which said projection is disengaged from said upright wall portion when said lens barrel is in said photographing position;

said first gear is rotated relative to said clutch member until said projection engages with said upright wall portion when said lens barrel is moved from said photographing position to said retracted position, and thereafter said second gear which is elastically connected to said clutch member under a spring force is rotated;

said first gear is rotated in a direction to move said projection away from said upright wall portion and said second gear which engages with said rack of said locking member is rotated in the same direction in association with the rotation of said first gear by the spring force of said linearly extending biasing spring when said lens barrel is moved from said retracted position to said photographing position.

7. A sliding movement locking apparatus according to claim 6, wherein, upon occurrence of an abnormal operation to lock said locking member in the forward extremity of movement, said first gear is rotated relative to said clutch member until said projection engages with said upright wall portion and thereafter said coil spring is deformed so that said clutch member is rotated relative to said second gear, when said lens barrel is moved from said photographing position to said retracted position.

8. A sliding movement locking apparatus according to claim 7, wherein when said lens barrel is returned to said retracted position and if said abnormal operation to lock the locking member in the forward extremity of movement has been discontinued, the locking member is moved rearward from the forward extremity of movement due to the restoring force of the coil spring.

9. A sliding movement locking apparatus according to claim 6, wherein the spring force of said coil spring to connect the clutch member and said second gear under a spring force is stronger than the spring force of said linearly extending biasing spring to bias said second gear in the direction to move said locking member toward the forward extremity of movement.

10. A sliding movement locking apparatus for a sliding cover of a camera comprising:

a lens barrel which is movable between a photographing position and a retracted position;

a sliding cover which can be moved in front of said lens barrel which is in said retracted position;

a sliding movement locking member which is moved in the forward and rearward direction of said camera and prevents the closure of the sliding cover at the forward extremity of movement of the locking member;

an association drive member which moves said locking member to the forward extremity of movement when said lens barrel is moved to said photographing position and which moves said locking member from the forward extremity of movement when the lens barrel is returned to said retracted position; and a clutch mechanism provided in said association drive mechanism, said clutch mechanism associates said locking member with said lens barrel in the normal state in which said locking member is movable in association with said lens barrel and said clutch mechanism breaks the association of said locking member with said lens barrel to thereby permit said lens barrel to move in an abnormal state in which an external force is applied to said locking member to make the movement thereof impossible.

11. A sliding movement locking apparatus according to claim 10, wherein said clutch mechanism comprises a spring means which is deformed due to the force produced by the movement of said lens barrel when an abnormal operation in which an external force is applied to prevent the movement of said locking member is carried out and which associates said locking member with said lens barrel due to the restoring force of said spring means when the abnormal operation is released.

* * * * *